US009342265B2

(12) United States Patent
Kano et al.

(10) Patent No.: US 9,342,265 B2
(45) Date of Patent: May 17, 2016

(54) IMAGE FORMING SYSTEM, APPARATUS, METHOD, AND NON-TRANSITORY COMPUTER-READABLE RECORDING MEDIUM ENCODED WITH IMAGE FORMING PROGRAM FOR MANAGEMENT OF THE AMOUNT OF RESOURCES CONSUMED

(75) Inventors: Takahiro Kano, Toyonaka (JP); Norihisa Takayama, Kobe (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/102,135

(22) Filed: May 6, 2011

(65) Prior Publication Data

US 2011/0279858 A1 Nov. 17, 2011

(30) Foreign Application Priority Data

May 17, 2010 (JP) .................................. 2010-113111

(51) Int. Cl.
G06F 3/12 (2006.01)
(52) U.S. Cl.
CPC ............ *G06F 3/1285* (2013.01); *G06F 3/1218* (2013.01); *G06F 3/1253* (2013.01); *G06F 3/1256* (2013.01); *G06F 3/1257* (2013.01)
(58) Field of Classification Search
CPC ... G06F 3/1218; G06F 3/1253; G06F 3/1256; G06F 3/1257; G06F 3/1285
USPC .............. 358/1.9, 1.13–1.15, 530; 399/24, 27
See application file for complete search history.

(56) References Cited

U.S. PATENT DOCUMENTS 5,258,779 A * 11/1993 Serizawa ................ G06K 15/16
346/134
5,802,420 A * 9/1998 Garr ...................... B41J 2/17566
347/19

(Continued)

FOREIGN PATENT DOCUMENTS

EP 1076270 A2 * 2/2001 ........... G03G 15/326
JP 11143667 A * 5/1999

(Continued)

OTHER PUBLICATIONS

Office Action (Notice of Allowance) dated Feb. 14, 2012, issued by the Japanese Patent Office in corresponding Japanese Patent Application No. 2010-113111 and English Translation of Office Action. (6 pages).

*Primary Examiner* — Tammy Pham
*Assistant Examiner* — Edwin S. Leland, III
(74) *Attorney, Agent, or Firm* — Buchanan Ingersoll & Rooney PC

(57) ABSTRACT

An image forming apparatus includes a portion to receive a print job, a portion to generate print data of the print job, a portion to perform prescribed processing on the print data to convert it into processed data, a portion to form an image of the print data or the processed data, a portion to generate first reduction information including a difference in the amount of resources consumed when an image is formed under a print condition included in the print job and when an image is formed under a predetermined print condition, a portion to generate second reduction information including a difference in the amount of resources consumed when an image is formed from the print data and when an image is formed from the processed data, and a portion to store history information which associates the first and second reduction information with the print job.

7 Claims, 16 Drawing Sheets

(56) References Cited

U.S. PATENT DOCUMENTS

| | | | |
|---|---|---|---|
| 5,950,043 A * | 9/1999 | Fujita | G03G 15/0131 399/29 |
| 6,507,409 B2 * | 1/2003 | Kawaguchi | B41J 2/17546 347/20 |
| 7,239,411 B2 * | 7/2007 | Kelsey | G06F 3/1205 358/1.1 |
| 7,788,318 B2 * | 8/2010 | Kinoshita | H04N 1/00127 358/1.15 |
| 7,856,202 B2 * | 12/2010 | Mizobuchi | G03G 21/02 399/389 |
| 7,925,173 B2 * | 4/2011 | Yamada | G03G 15/556 399/27 |
| 8,170,429 B2 * | 5/2012 | Nishikawa | G03G 15/553 399/27 |
| 8,259,333 B2 * | 9/2012 | Nakagawa | G03G 21/02 358/1.14 |
| 2002/0140960 A1 * | 10/2002 | Ishikawa | H04L 12/58 358/1.13 |
| 2003/0137680 A1 * | 7/2003 | Maruoka | G06K 15/00 358/1.13 |
| 2004/0246512 A1 * | 12/2004 | Miyamoto | B41J 2/04 358/1.13 |
| 2005/0111015 A1 * | 5/2005 | Tsujimoto | G06K 15/005 358/1.9 |
| 2005/0147421 A1 * | 7/2005 | Nakashima | G03G 15/553 399/23 |
| 2006/0193001 A1 * | 8/2006 | Ii | H04N 1/00204 358/1.15 |
| 2006/0228123 A1 * | 10/2006 | Zaima | G03G 15/5079 399/24 |
| 2007/0121172 A1 * | 5/2007 | Hamada | G06F 9/5027 358/419 |
| 2007/0211284 A1 * | 9/2007 | Kelsey | G06F 3/1205 358/1.15 |
| 2007/0279673 A1 * | 12/2007 | Utsunomiya | G03G 15/55 358/1.14 |
| 2008/0003033 A1 * | 1/2008 | Aizawa | G03G 15/5004 400/62 |
| 2008/0008508 A1 * | 1/2008 | Mizobuchi | G03G 21/02 399/389 |
| 2008/0144098 A1 * | 6/2008 | Ishigaki | G06F 3/1214 358/1.15 |
| 2009/0210435 A1 * | 8/2009 | Akiyama | G06F 17/30292 |
| 2009/0244586 A1 * | 10/2009 | Sei | G03G 21/02 358/1.13 |
| 2009/0279108 A1 * | 11/2009 | Hoshi | H04N 1/3871 358/1.2 |
| 2009/0287806 A1 * | 11/2009 | Hamilton, II | G06F 3/1219 709/223 |
| 2010/0014132 A1 * | 1/2010 | Kato | G06T 11/60 358/530 |
| 2010/0027052 A1 * | 2/2010 | Ferlitsch | G06F 3/1204 358/1.15 |
| 2010/0053673 A1 * | 3/2010 | Oba | G03G 21/02 358/1.15 |
| 2010/0091328 A1 * | 4/2010 | Tsukada | G06K 15/00 358/1.15 |
| 2010/0182618 A1 * | 7/2010 | Akiyama | H04N 1/00795 358/1.9 |
| 2010/0188681 A1 * | 7/2010 | Kawano | G03G 21/02 358/1.13 |
| 2010/0265546 A1 * | 10/2010 | Mori | G06F 3/1257 358/1.15 |
| 2011/0109929 A1 * | 5/2011 | Korndoerfer | G03K 15/1823 358/1.11 |
| 2011/0255129 A1 * | 10/2011 | Tamura | G06F 3/1221 358/1.15 |

FOREIGN PATENT DOCUMENTS

| | | | | |
|---|---|---|---|---|
| JP | 11259264 A * | 9/1999 | | |
| JP | EP 1170663 A2 * | 1/2002 | | G06F 9/5033 |
| JP | 2003186361 A * | 7/2003 | | |
| JP | 2003-248576 A | 9/2003 | | |
| JP | 2003-248576 A * | 9/2003 | | |
| JP | 2004-287779 A | 10/2004 | | |
| JP | 2005-186315 A | 7/2005 | | |
| JP | 2006-352801 A | 12/2006 | | |
| JP | 2007-175958 A | 7/2007 | | |
| JP | 2007-320247 A | 12/2007 | | |
| JP | 2008-22423 A | 1/2008 | | |
| JP | 2008-143095 A | 6/2008 | | |
| JP | 2009-75896 A | 4/2009 | | |
| JP | 2009-151474 A | 7/2009 | | |
| JP | 2010-26769 A | 2/2010 | | |
| JP | 2010052414 A * | 3/2010 | | |

* cited by examiner

F I G. 13

DATA OF SAVED RESOURCES MANAGED IN TOTAL

| JOB IDENTIFICATION INFORMATION | PAPER | TONER AMOUNT | POWER CONSUMPTION |
|---|---|---|---|
| JOB 1 | 50% | 0% | 50W |
| JOB 2 | 50% | 50% | 0W |
| . . . | | | |

IMAGE FORMING SYSTEM, APPARATUS, METHOD, AND NON-TRANSITORY COMPUTER-READABLE RECORDING MEDIUM ENCODED WITH IMAGE FORMING PROGRAM FOR MANAGEMENT OF THE AMOUNT OF RESOURCES CONSUMED

This application is based on Japanese Patent Application No. 2010-113111 filed with Japan Patent Office on May 17, 2010, the entire content of which is hereby incorporated by reference.

BACKGROUND OF THE INVENTION

1. Field of the Invention

The present invention relates to an image forming system, an image forming apparatus, an image forming method, and an image forming program. More particularly, the present invention relates to an image forming system, an image forming apparatus, an image forming method, and an image forming program recorded on a non-transitory computer-readable recording medium which enable management of the amount of resources consumed.

2. Description of the Related Art

Recently, there is known a system which manages the number of sheets of paper consumed in an image forming apparatus, typified by a multi-function peripheral (MFP), for the purposes of saving resources. For example, Japanese Patent Laid-Open No. 2003-248576 discloses a peripheral device management system which is made up of a peripheral device and an information processor, such as a PC, connected to the peripheral device through a network. According to this system, history information including the ID of a user who has used the peripheral device, print setting information (both sides, one side), and discharging sheet count information is accumulated in a history information accumulating portion. The information processor collects and totalizes the history information accumulated in the peripheral device, and calculates, on the basis of the history information, the difference between the number of sheets of paper actually discharged and the number of sheets of paper that would have been spent if every sheet were printed on both sides, and also calculates a reduction rate from the difference, and displays the calculated difference and reduction rate.

The conventional peripheral device management system, however, can only totalize the results of printing to inform a user of the reduction rate. Whether printing is to be performed on both sides or one side is determined in a step in which a user sets a print condition. Therefore, it will be effective if the reduction rate can be notified to a user before formation of an image, which will be able to prompt the user to change the setting to a print condition in which a fewer number of sheets of paper will be consumed. The resources consumed by an MFP include toner and electric power as well as paper. It is thus desired to reduce the consumption of toner and power as well.

On the other hand, an MFP is able to receive print data from a personal computer (hereinafter, referred to as a "PC") and the like to form an image. In this case, some print conditions are set by a driver which is included in the PC and controls the MFP. In this type of usage, there are some other print conditions that cannot be set on the PC side but can be set on the MFP side.

SUMMARY OF THE INVENTION

The present invention has been accomplished in view of the foregoing problems, and an object of the present invention is to provide an image forming system which is able to store the amount of saved resources accurately as a history.

Another object of the present invention is to provide an image forming apparatus which is able to store the amount of saved resources accurately as a history.

A further object of the present invention is to provide an image forming method and an image forming program which enable the amount of saved resources to be stored accurately as a history.

To achieve the above-described objects, according to an aspect of the present invention, there is provided an image forming system including an image forming apparatus for forming an image and an information processing apparatus capable of communicating with the image forming apparatus, wherein the information processing apparatus includes: a setting portion to set a print condition; a first reduction information generating portion to generate first reduction information including a difference between the amount of resources which will be consumed when the image forming apparatus forms an image in accordance with the set print condition and the amount of resources which will be consumed when the image forming apparatus forms an image in accordance with a predetermined print condition; a job generating portion to generate a print job for causing the image forming apparatus to form an image on the basis of the set print condition; and a job transmitting portion to transmit the generated first reduction information together with the generated print job to the image forming apparatus, and the image forming apparatus includes: a print data generating portion to generate print data on the basis of the print job received from the information processing apparatus; a conversion portion to perform a prescribed process on the generated print data to convert the data into processed data; an image forming portion to form an image on the basis of the generated print data or the processed data; a second reduction information generating portion to generate second reduction information including a difference between the amount of resources which will be consumed when the image forming portion forms an image on the basis of the generated print data and the amount of resources which will be consumed when the image forming portion forms an image on the basis of the processed data; and a history storing portion, in response to an event that the image forming portion forms an image on the basis of the processed data, to store history information in which the first reduction information and the second reduction information are associated with the print job.

According to another aspect of the present invention, there is provided an image forming apparatus which includes: a print job receiving portion to receive a print job including a print condition; a print data generating portion to generate print data on the basis of the received print job; a conversion portion to perform a prescribed process on the generated print data to convert the data into processed data; an image forming portion to form an image on the basis of the generated print data or the processed data; a first reduction information generating portion to generate first reduction information including a difference between the amount of resources which will be consumed when an image is formed on the basis of the print condition included in the received print job and the amount of resources which will be consumed when an image is formed on the basis of a predetermined print condition; a second reduction information generating portion to generate second reduction information including a difference between the amount of resources which will be consumed when the image forming portion forms an image on the basis of the generated print data and the amount of resources which will be consumed when the image forming portion forms an image on the basis of the processed data; and a history storing portion, in response to an event that the image forming portion forms an image on the basis of the processed data, to store history information in which the first reduction information and the second reduction information are associated with the print job.

According to a further aspect of the present invention, there is provided an image forming method which includes the steps of: receiving a print job including a print condition; generating print data on the basis of the received print job; performing a prescribed process on the generated print data to convert the data into processed data; forming an image on the basis of the generated print data or the processed data; generating first reduction information including a difference between the amount of resources which will be consumed when an image is formed on the basis of the print condition included in the received print job and the amount of resources which will be consumed when an image is formed on the basis of a predetermined print condition; generating second reduction information including a difference between the amount of resources which will be consumed when an image is formed on the basis of the generated print data and the amount of resources which will be consumed when an image is formed on the basis of the processed data; and, in response to an event that an image is formed on the basis of the processed data in the step of forming an image, storing history information in which the first reduction information and the second reduction information are associated with the print job.

According to yet another aspect of the present invention, there is provided a non-transitory computer-readable recording medium encoded with an image forming program which causes a computer to execute processing including the steps of: receiving a print job including a print condition; generating print data on the basis of the received print job; performing a prescribed process on the generated print data to convert the data into processed data; forming an image on the basis of the generated print data or the processed data; generating first reduction information including a difference between the amount of resources which will be consumed when an image is formed on the basis of the print condition included in the received print job and the amount of resources which will be consumed when an image is formed on the basis of a predetermined print condition; generating second reduction information including a difference between the amount of resources which will be consumed when an image is formed on the basis of the generated print data and the amount of resources which will be consumed when an image is formed on the basis of the processed data; and, in response to an event that an image is formed on the basis of the processed data in the step of forming an image, storing history information in which the first reduction information and the second reduction information are associated with the print job.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an example of history data;

DESCRIPTION OF THE PREFERRED EMBODIMENTS

Figure 1:
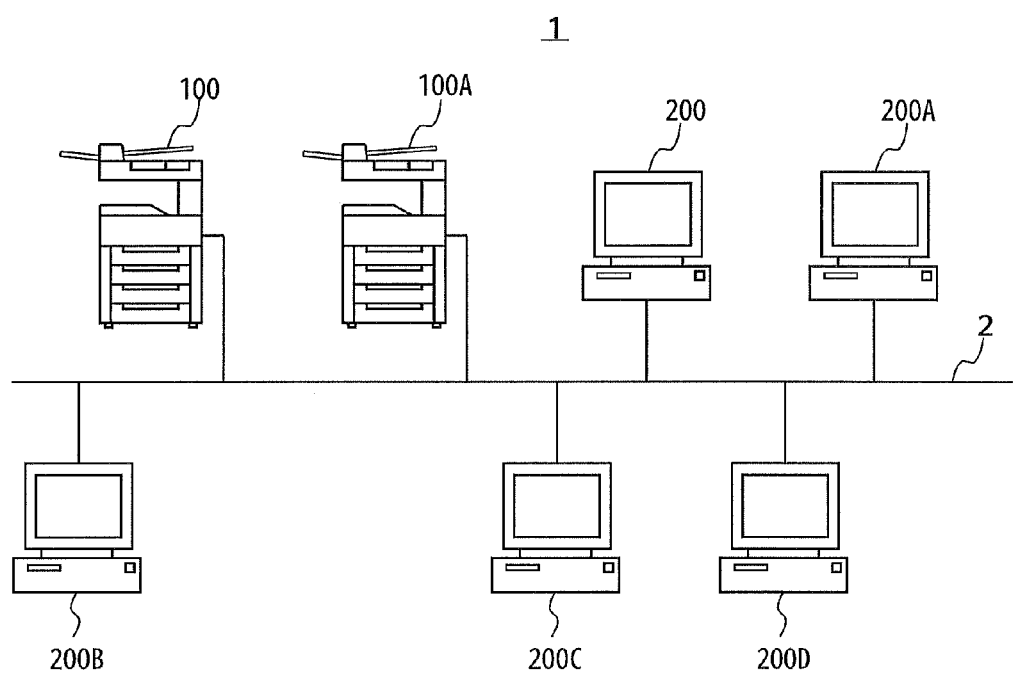
FIG. 1 schematically shows an image forming system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows an image forming system according to an embodiment of the present invention. Referring to FIG. 1, an image forming system 1 includes multi-function peripherals (hereinafter, referred to as "MFPs") 100 and 100A, and PCs 200, 200A, 200B, 200C, and 200D. MFPs 100 and 100A and PCs 200, 200A, 200B, 200C, and 200D are each connected to a network 2.

Network 2 is a local area network (LAN), which may be connected in a wired or wireless manner. Network 2 is not necessarily the LAN; it may be a wide area network (WAN), the Internet, a general public network, or the like.

PCs 200 and 200A to 200D are typical computers. Each of PCs 200 and 200A to 200D has installed therein an application program and a driver program for controlling MFPs 100 and 100A which are connected thereto through network 2. This enables data, generated by executing the application program, to be printed using one of MFPs 100 and 100A.

While two MFPs, 100 and 100A, are shown in FIG. 1, the number of MFPs is not limited thereto; at least one MFP may be connected to network 2. The hardware configurations of MFPs 100 and 100A are identical to each other, and thus, unless otherwise specified, MFP 100 will be described representatively. Similarly, while five PCs, 200, 200A, 200B, 200C, and 200D, are shown in FIG. 1, the number of PCs is not limited thereto; at least one PC may be connected to network 2. The hardware configurations of PCs 200, 200A, 200B, 200C, and 200D are identical to one another, and thus, unless otherwise specified, PC 200 will be described representatively.

Figure 2:
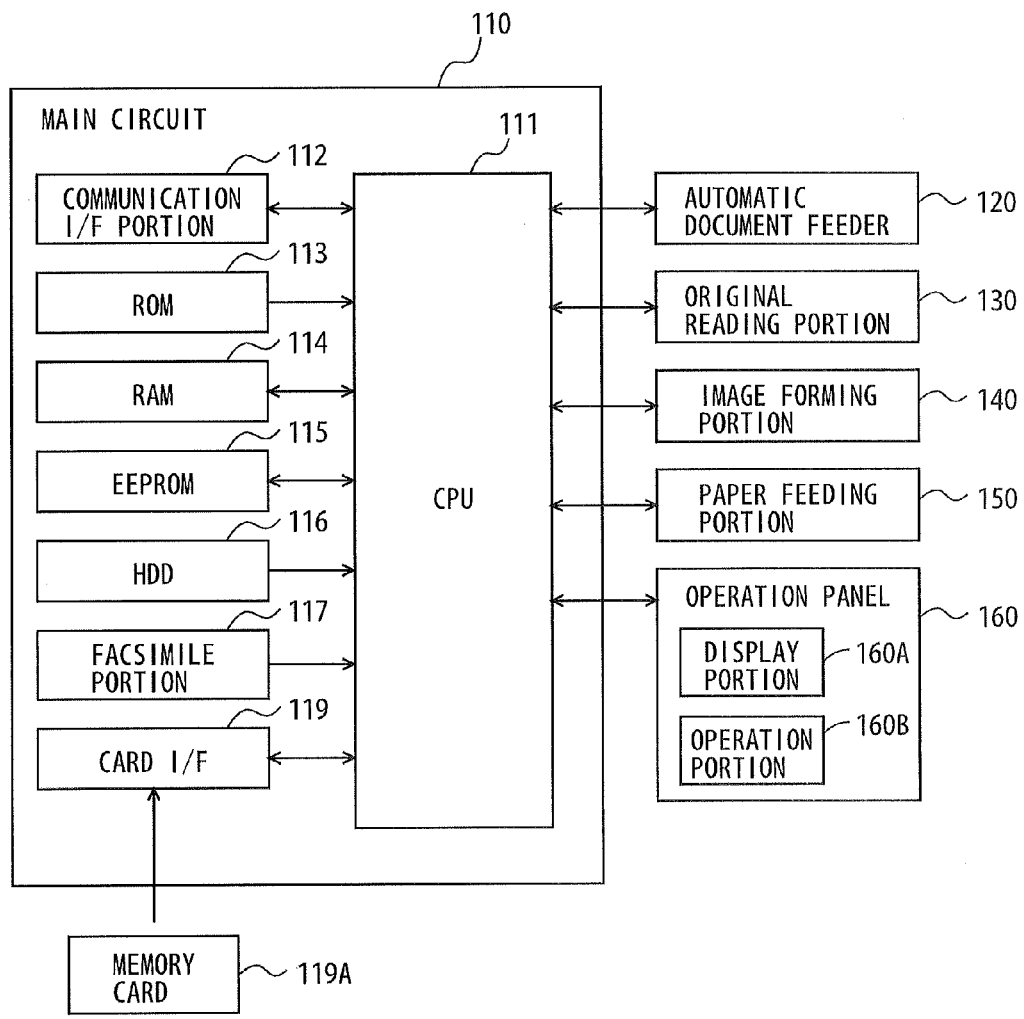
FIG. 2 is a block diagram showing, by way of example, the hardware configuration of an MFP.

FIG. 2 is a block diagram showing, by way of example, the hardware configuration of the MFP. Referring to FIG. 2, MFP 100 includes: a main circuit 110; an original reading portion 130 which reads an original; an automatic document feeder 120 which carries an original into original reading portion 130; an image forming portion 140 which forms, on a sheet of paper or the like, a still image which is output from original reading portion 130 that has read the image from an original; a paper feeding portion 150 which supplies a sheet of paper to image forming portion 140; and an operation panel 160 serving as a user interface.

Main circuit 110 includes a central processing unit (CPU) 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, and a card interface (I/F) 119 to which a memory card 119A is mounted.

CPU 111 is connected with automatic document feeder 120, original reading portion 130, image forming portion 140, paper feeding portion 150, and operation panel 160, and is responsible for overall control of MFP 100. ROM 113 stores a program executed by CPU 111 as well as data necessary for execution of the program. RAM 114 is used as a work area when CPU 111 executes a program. Further, RAM 114 temporarily stores still images continuously transmitted from original reading portion 130.

Operation panel 160, which is provided on an upper surface of MFP 100, includes a display portion 160A and an operation portion 160B. Display portion 160A is a display such as a liquid crystal display (LCD) or an organic electroluminescence display (ELD), and displays an instruction menu for a user, information about acquired image data, and others. Operation portion 160B, which is provided with a plurality of keys, accepts input data such as instructions, characters, and numerical characters, according to the key operations by the user. Operation portion 160B further includes a touch panel provided on display portion 160A.

Communication I/F portion 112 is an interface for connecting MFP 100 to network 2. CPU 111 communicates with each of PCs 200, 200A, 200B, 200C, and 200D via communication I/F portion 112, for transmission/reception of data. Further, communication I/F portion 112 is capable of communicating with a computer connected to the Internet via network 2.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received by facsimile portion 117 on a sheet of paper. Further, facsimile portion 117 converts the data stored in HDD 116 to facsimile data, and transmits it to a facsimile machine connected to the PSTN.

Card I/F 119 is mounted with memory card 119A. CPU 111 is capable of accessing memory card 119A via card I/F 119. CPU 111 loads a program recorded on memory card 119A mounted to card I/F 119, to RAM 114 for execution. It is noted that the program executed by CPU 111 is not restricted to the program recorded on memory card 119A. CPU 111 may load a program stored in HDD 116, to RAM 114 for execution. In this case, another computer connected to network 2 may rewrite the program stored in HDD 116 of MFP 100, or may additionally write a new program therein.

Further, MFP 100 may download a program from another computer connected to network 2, and store the program in HDD 116. As used herein, the "program" includes, not only the program which CPU 111 can execute directly, but also a source program, a compressed program, an encrypted program, and others.

Each of MFPs 100 and 100A can switch its operating condition between a normal condition and a power-saving condition in which less power is consumed than in the normal condition, and transmits the operating condition to PCs 200 and 200A to 200D via network 2. For MFPs 100 and 100A to transmit their operating conditions to PCs 200 and 200A to 200D, a well-known technique can be used, which may be for example a technique in which a management information base (MIB) is transmitted. Although the power consumption is smaller in the power-saving condition than in the normal condition, MFPs 100 and 100A cannot form an image in the power-saving condition; they can form an image only in the normal condition. Further, when MFP 100 or 100A switches the operating condition from the power-saving condition to the normal condition, certain power (hereinafter, referred to as "starting power") is consumed before the operating condition has been changed to the normal condition. Hereinafter, the power that is consumed when the operating condition of MFP 100 or 100A is changed from the power-saving condition to the normal condition will be referred to as "starting power". The values of the starting power of the respective MFPs 100 and 100A are stored in advance in the respective PCs 200 and 200A to 200D.

Figure 3:
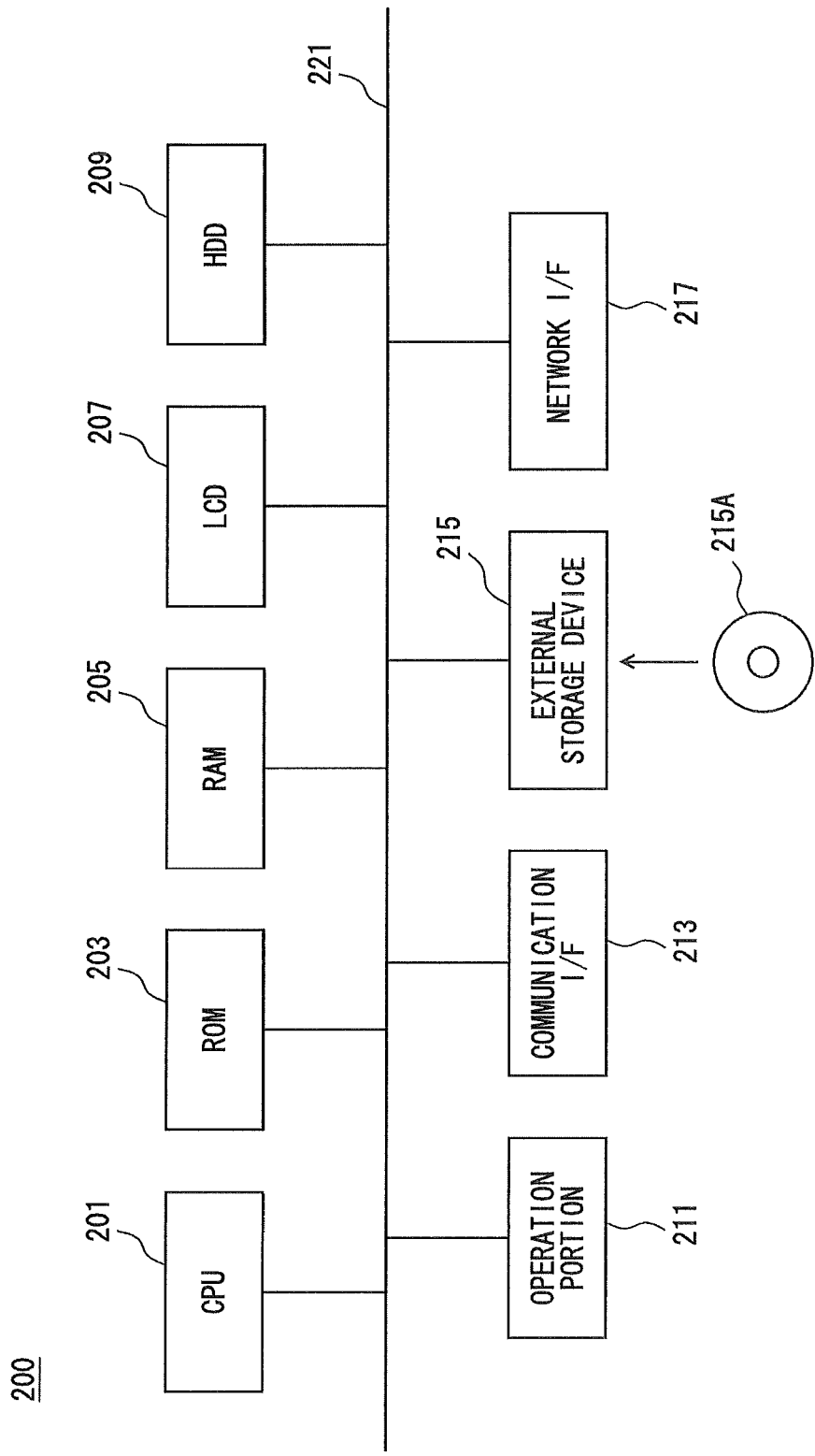
FIG. 3 is a block diagram showing, by way of example, the hardware configuration of a PC.

FIG. 3 is a block diagram showing, by way of example, the hardware configuration of the PC. Referring to FIG. 3, PC 200 includes: a CPU 201 which is responsible for overall control of PC 200; a ROM 203 which stores a program executed by CPU 201 and the like; a RAM 205 which is used as a work area for CPU 201; an LCD 207; a HDD 209 as a mass storage; an operation portion 211 for accepting an input of an operation by a user; a communication I/F 213 which connects PC 200 to an external device; an external storage device 215; and a network I/F 217 which connects PC 200 to network 2.

Operation portion 211 includes a keyboard and/or a pointing device such as a mouse, and accepts an operation which a user inputs using the same.

External storage device 215 can be mounted with a removable compact disc ROM (CD-ROM) 215A. CPU 201 is capable of accessing CD-ROM 215A via external storage device 215. While it is here assumed that the program to be executed by CPU 201 is stored in ROM 203, CPU 201 may load the program stored in CD-ROM 215A into RAM 205 for execution. The recording medium for storing the program executed by CPU 201 is not restricted to CD-ROM 215A. It may be an optical disk (magnetic optical disc (MO), mini disc (MD), digital versatile disc (DVD)), an IC card, an optical card, or a semiconductor memory such as a mask ROM, an erasable and programmable ROM (EPROM), an EEPROM, or the like.

Further, CPU 201 may load a program stored in HDD 209 into RAM 205 for execution. In this case, another computer connected to network 2 may rewrite the program stored in HDD 209 of PC 200, or may additionally write a new program therein. Further, PC 200 may download a program from another computer connected to network 2, and store the program in HDD 209. As used herein, the "program" includes, not only the program which CPU 201 can execute directly, but also a source program, a compressed program, an encrypted program, and others.

Figure 4:
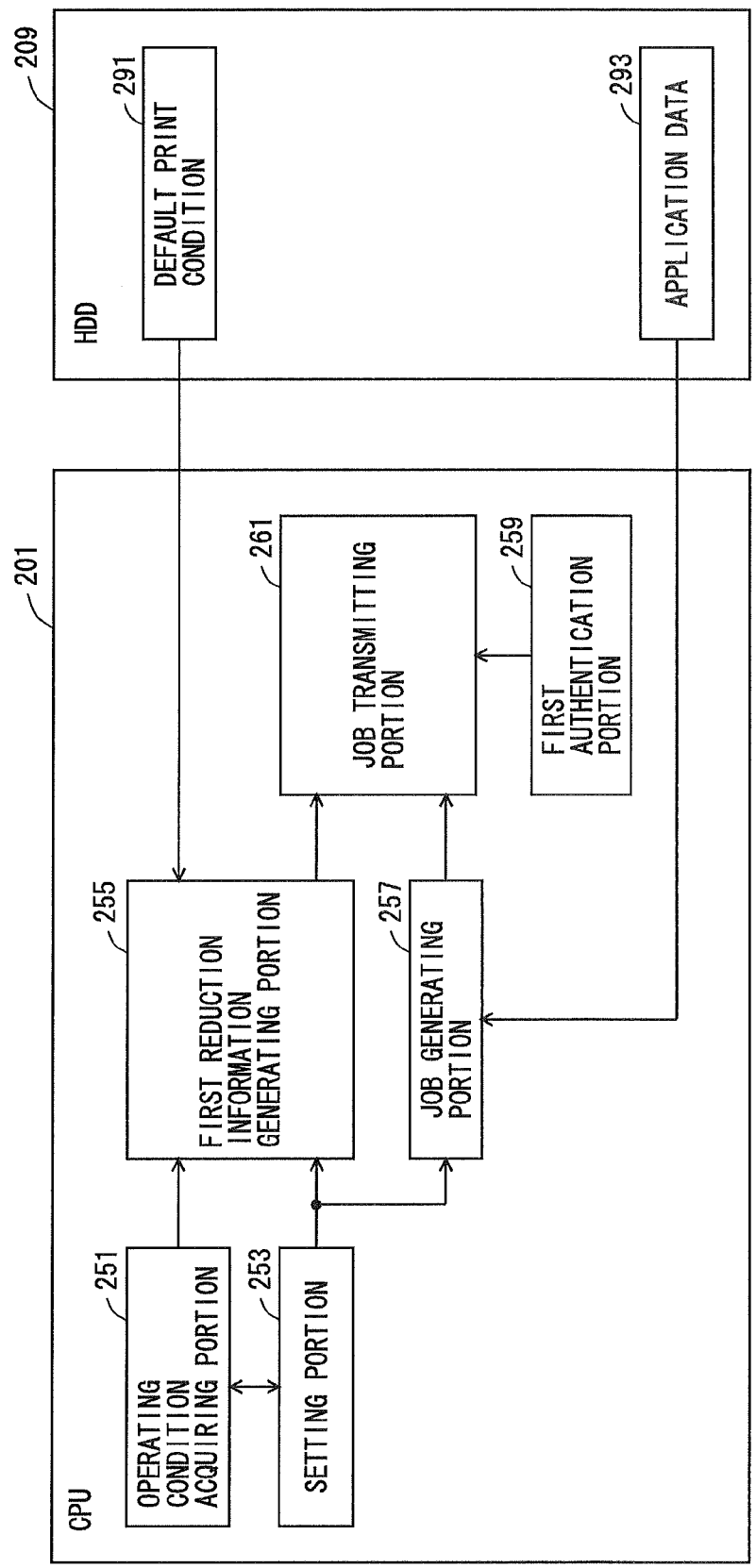
FIG. 4 is a block diagram showing, by way of example, the functions of a CPU included in the PC.

FIG. 4 is a block diagram showing, by way of example, the functions of the CPU included in the PC. The functions shown in FIG. 4 are implemented as CPU 201 included in PC 200 executes a driver program stored in ROM 203, HDD 209, or CD-ROM 215A.

Referring to FIG. 4, CPU 201 includes: an operating condition acquiring portion 251 which acquires an operating condition of each of MFPs 100 and 100A; a setting portion 253 which sets a print condition; a first reduction information generating portion 255 which generates first reduction information on the basis of the print condition; a job generating portion 257 which generates a print job; a job transmitting portion 261 which transmits the first reduction information and the print job to MFP 100 or 100A; and a first authentication portion 259 which authenticates a user.

First authentication portion 259 authenticates a user who operates PC 200. First authentication portion 259 stores a set of user identification information for identifying a user who is authorized to operate PC 200 and a password in HDD 209 in advance. When a user inputs a set of user identification information and a password to operation portion 211, in the case where the same set as that input by the user is stored in HDD 209, first authentication portion 259 authenticates the user; otherwise, first authentication portion 259 does not authenticate the user. The set of user identification information for identifying a user authorized to operate PC 200 and a password does not necessarily have to be stored in HDD 209; it may be stored in another computer, such as a server, which is connected to network 2. When first authentication portion 259 authenticates a user, it outputs the user identification information of the user to job transmitting portion 261. Once first authentication portion 259 has authenticated the user who operates PC 200, it treats any instruction input to operation portion 211 as an operation input by the authenticated user, until a logoff operation is input to operation portion 211.

When network I/F 217 receives an MIB from MFP 100 or 100A, operating condition acquiring portion 251 detects an operating condition of each of MFPs 100 and 100A from the received MIB. It is here assumed that the operating condition is either the normal condition or the power-saving condition. Operating condition acquiring portion 251 outputs the operating conditions of the respective MFPs 100 and 100A, on the basis of the MIBs received therefrom, to setting portion 253.

Figure 5:
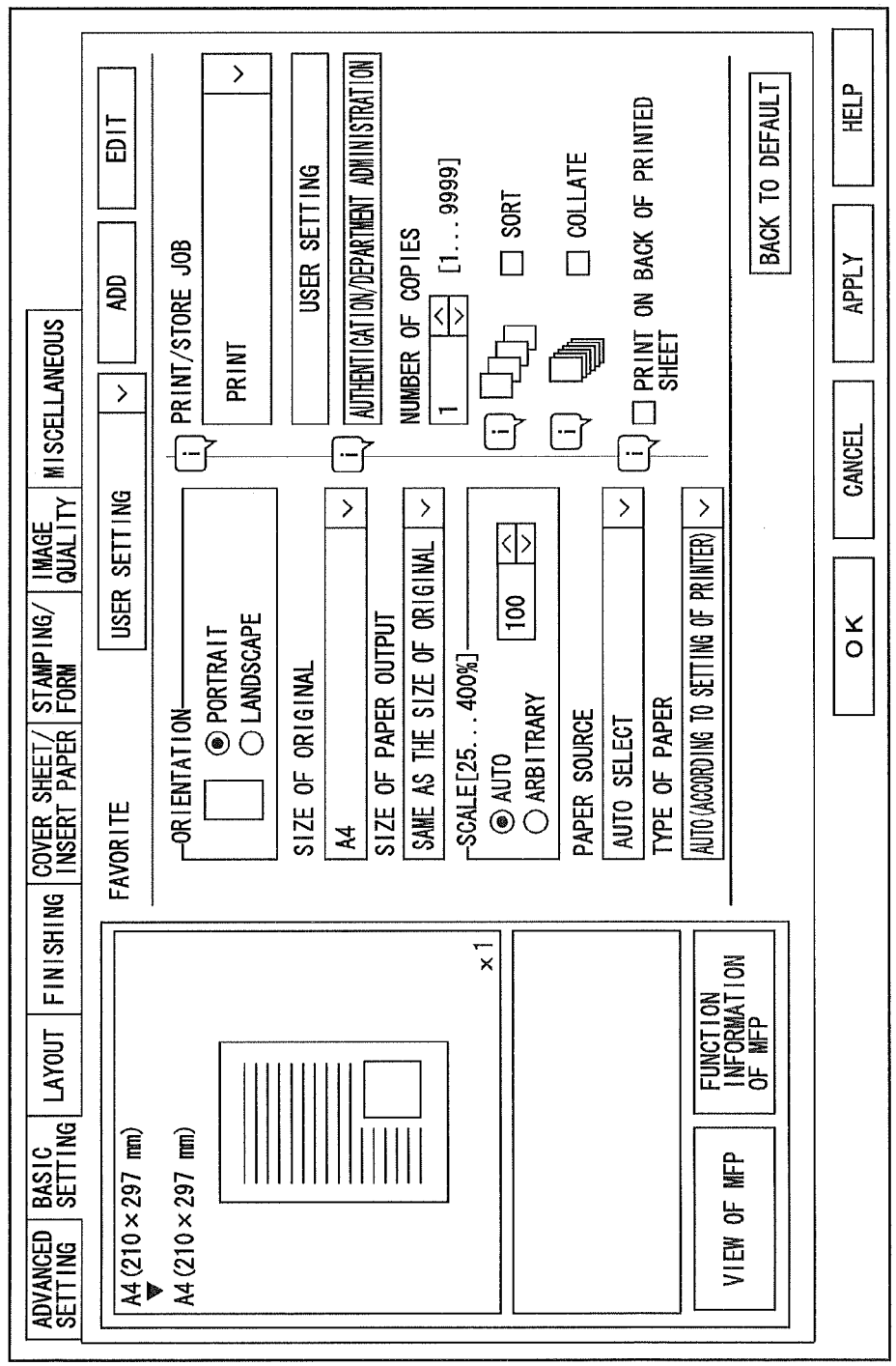
FIG. 5 shows an example of a basic setting screen which is one of print setting screens.
Figure 6:
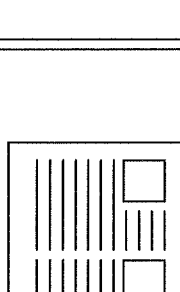
FIG. 6 shows an example of a layout setting screen which is one of the print setting screens.
Figure 7:
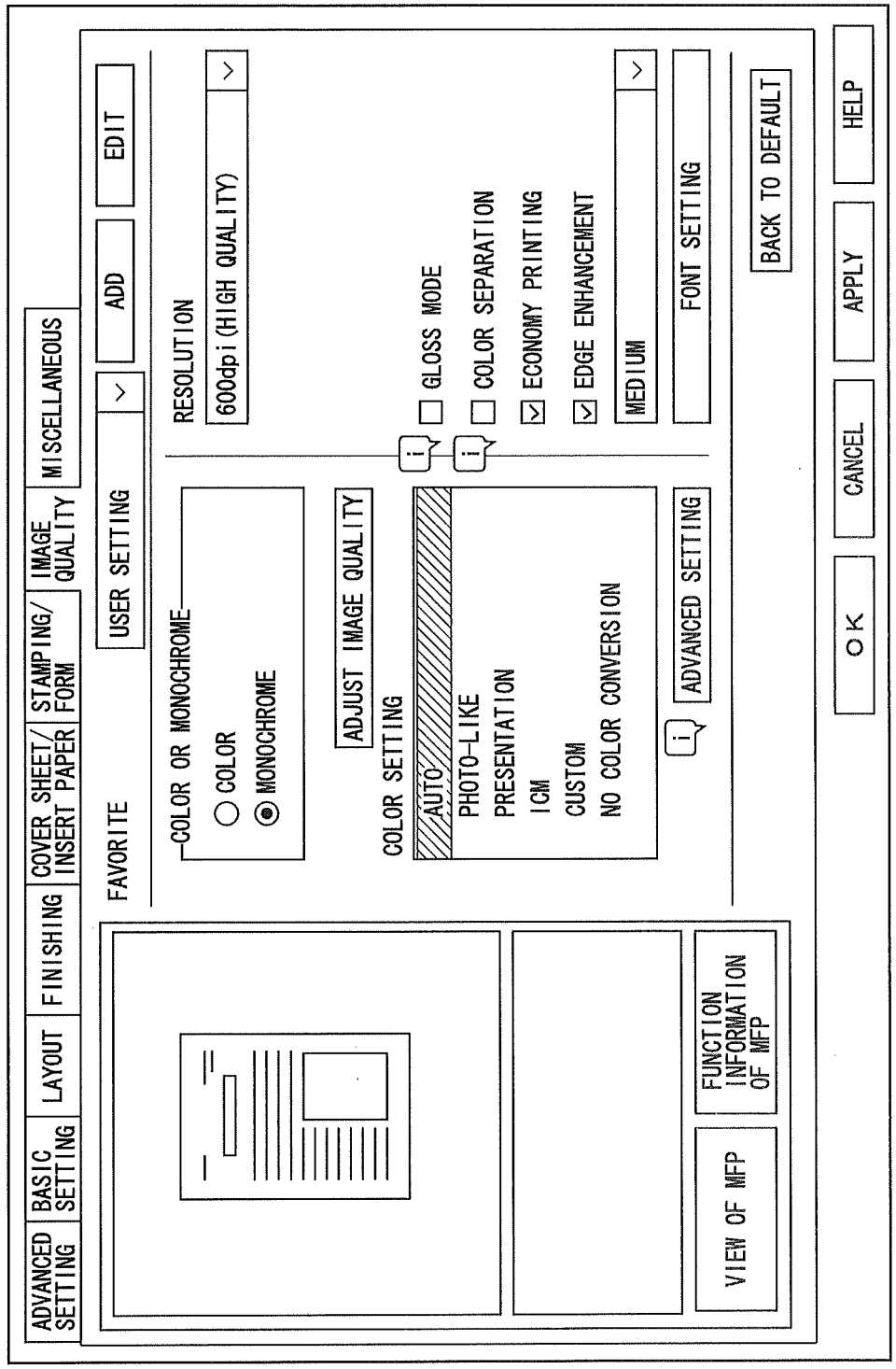
FIG. 7 shows an example of an image quality setting screen which is one of the print setting screens.

Setting portion 253 displays a print setting screen on LCD 207, and accepts a print condition input to operation portion 211 by a user. FIGS. 5 to 7 show examples of the print setting screens. FIG. 5 shows a basic setting screen, as one of the print setting screens, which includes fields for setting the size of original, the size of paper, and the number of copies.

FIG. 6 shows a layout setting screen, as one of the print setting screens, which includes fields for setting the number of pages to be laid out on a sheet of paper, and the type of print indicating whether an image is to be formed on both sides or one side of a sheet of paper. In FIG. 6, "2-up" is set in the "page layout" field for setting the number of pages to be laid out on a sheet of paper, indicating that it has been set such that two pages are laid out on a sheet of paper. Further, "one side" is set in the field for setting the type of print, indicating that it has been set such that an image is formed on one side of each sheet of paper.

FIG. 7 shows an image quality setting screen, as one of the print setting screens, which includes a field for setting color or monochrome, a field for setting resolution, a field for setting the amount of toner to be used, and a field for setting enhancement of the edges in the image. In FIG. 7, "monochrome" is set in the "color or monochrome" field for setting either color or monochrome. "600 dpi" is set in the field for setting resolution, indicating that it has been set to form an image at resolution of 600 dpi. The "economy printing" field is checked to set the economy printing in which the amount of toner to be consumed is less than usual. The "edge enhancement" field is checked and "medium" is selected therebelow, indicating that the medium-level edge enhancement has been set.

Returning to FIG. 4, setting portion 253 outputs a print condition, which has been accepted by operation portion 211 in accordance with the print condition setting screen, to job generating portion 257 and first reduction information generating portion 255. The print condition includes: apparatus identification information for specifying one of MFPs 100 and 100A to which printing is requested; identification information for identifying data to be printed; the number of copies; the number of pages to be printed on a sheet of paper; whether an image is printed in color or monochrome; resolution; size of paper; and whether an image is printed on both sides or one side. Data to be printed includes application data which is generated as CPU 201 executes an application program, or application data 293 which has been input from the outside and is stored in HDD 209.

Job generating portion 257 generates a print job on the basis of the print condition received from setting portion 253. The print job includes at least the print condition and the data to be printed, and is described using the page description language (PDL) or the printer job language (PJL). Job generating portion 257 outputs the generated print job to job transmitting portion 261.

First reduction information generating portion 255 receives the print condition from setting portion 253 and the operating condition of each of MFPs 100 and 100A from operating condition acquiring portion 251. First reduction information generating portion 255 generates first reduction information which includes a difference between the amount of resources to be consumed when one of the image forming apparatuses, i.e. one of MFPs 100 and 100A, that is specified by the apparatus identification information included in the print condition forms an image in accordance with the print condition, and the amount of resources to be consumed when the same image forming apparatus forms an image in accordance with a predetermined default print condition. Specifically, first reduction information generating portion 255 compares the print condition received from setting portion 253 with a default print condition 291 stored in HDD 209 to calculate a difference in the amount of resources to be consumed. The amount of resources to be consumed includes the number of sheets of paper, the amount of toner, and the power consumption.

Hereinafter, a method for calculating the amount of resources to be consumed will be described by way of example. It is here assumed that MFP 100 is the image forming apparatus specified by the apparatus identification information included in the print condition, and that, as the default print condition predetermined for MFP 100, "one" is set for the number of copies, "one" is set for the number of pages to be printed on a sheet of paper, "color" is selected from the options of color and monochrome, resolution is set to a maximum value available in the image forming apparatus, "A4" is set for the size of paper, and "one side" is selected from the options of both sides and one side.

First reduction information generating portion 255 specifies data to be printed, on the basis of the identification information for identifying the data to be printed that is included in the print condition, to acquire the number of pages included in the data. Then, first reduction information generating portion 255 compares the settings in the print condition, or more specifically, the number of pages to be printed on a sheet of paper, whether an image is to be printed on both sides or one side, and the number of copies, which are included in the print condition, with the counterparts included in default print condition 291, to thereby calculate the differences between the number of sheets of paper, the amount of toner, and the amount of power to be consumed when printing is performed in accordance with the default print condition and the number of sheets of paper, the amount of toner, and the amount of power to be consumed when printing is performed in accordance with the print condition received from setting portion 253. For example, assuming that the number of pages included in the data is ten, when the print condition includes the settings of "one" for the number of copies, "two" for the number of pages to be printed on a sheet of paper, "monochrome" selected from the options of color and monochrome, a maximum resolution value available for the image forming apparatus, "A4" for the size of paper, and "both sides" selected from the options of both sides and one side, then the number of sheets of paper to be consumed is "three". Therefore, the difference in terms of the number of sheets of paper to be consumed is seven (which is acquired by subtracting 3 from 10). The amount of toner to be consumed is calculated as follows. For one or more pages included in the data, an area occupied by an image in each page is calculated and a sum of the areas is acquired. The acquired total area is then multiplied by the amount of toner to be consumed per unit area, which is predetermined separately for color and monochrome. The power consumption (the amount of power to be consumed) is calculated as follows. Unit electric power to be consumed for forming one page of image is predetermined separately for color and monochrome, and the number of sheets of paper to be consumed is multiplied by the unit electric power.

Further, in the case where the image forming apparatus determined by default for the user authenticated by first authentication portion 259 is different from the image forming apparatus specified by the apparatus identification information included in the print condition, in the event that the image forming apparatus determined by default is in the power-saving condition and the image forming apparatus specified by the apparatus identification information included in the print condition is in the normal condition, first reduction information generating portion 255 obtains the starting power of the image forming apparatus determined by default as power consumption to be reduced, and sets the obtained power in the first reduction information. Specifically, the power consumption that has been calculated and set in the first reduction information is updated by adding the starting power thereto.

For example, in the case where the image forming apparatus determined by default for a user authenticated by first authentication portion 259 is MFP 100A and the image forming apparatus specified by the apparatus identification information included in the print condition is MFP 100, if the operating condition of MFP 100A is the power-saving condition and the operating condition of MFP 100 is the normal condition, then the value of the starting power predetermined for MFP 100A is added to the power consumption included in the first reduction information. This is for the following reasons. In order to cause MFP 100A, determined by default, to perform the print job, the operating condition of MFP 100A needs to be changed from the power-saving condition to the normal condition, for which the starting power is consumed. In contrast, in order to cause MFP 100 to perform the print job, no starting power is consumed.

First reduction information generating portion 255 outputs the generated first reduction information to job transmitting portion 261. Job transmitting portion 261 receives the print job from job generating portion 257, receives the first reduction information from first reduction information generating portion 255, and receives the user identification information from first authentication portion 259. Job transmitting portion 261 transmits a set of the print job, the first reduction information, and the user identification information to the image forming apparatus specified by the apparatus identification information included in the print job, via network I/F 217.

Figure 8:
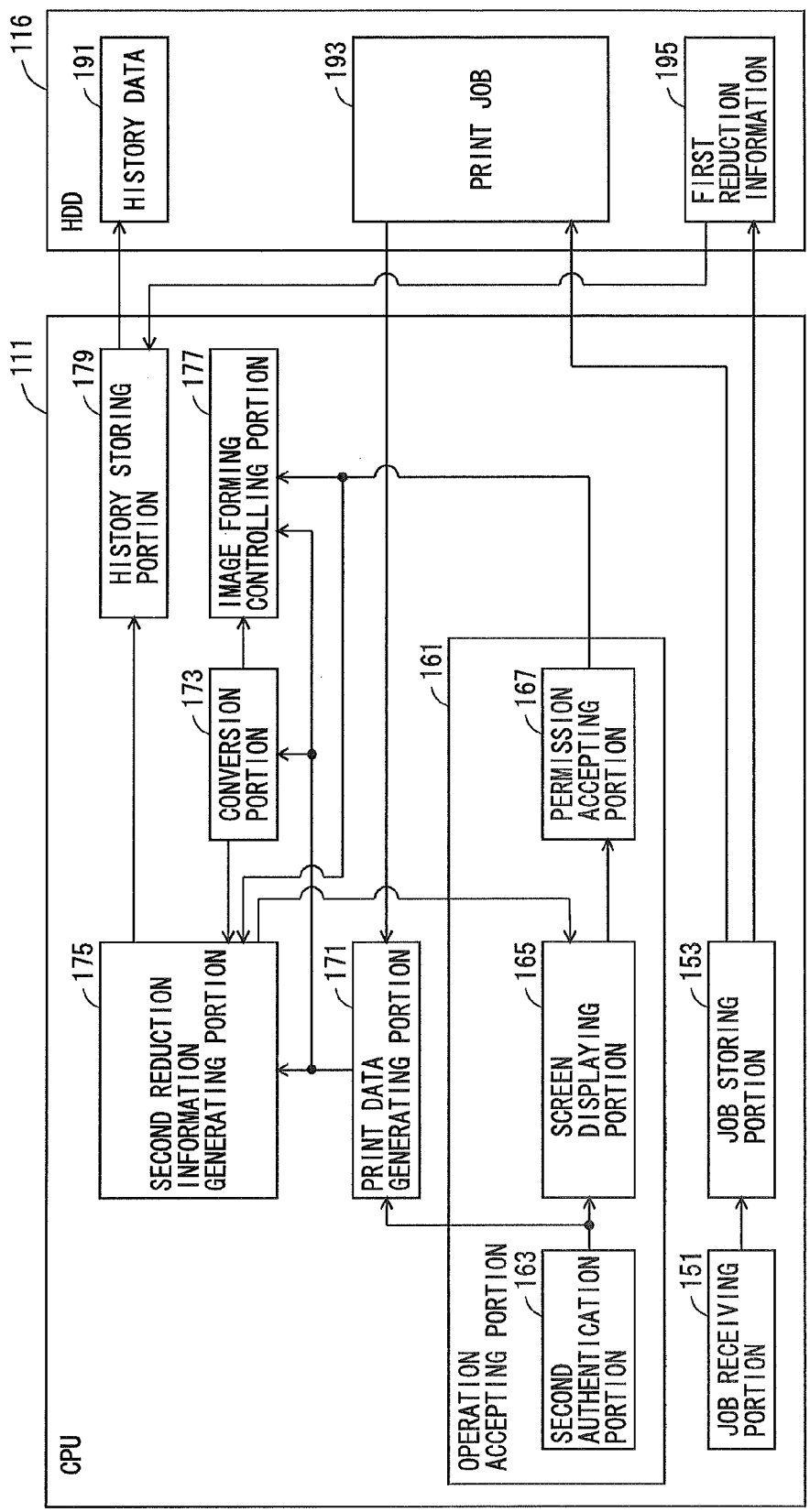
FIG. 8 is a block diagram showing, by way of example, the functions of a CPU included in the MFP, together with data stored in a HDD.

FIG. 8 is a block diagram showing, by way of example, the functions of the CPU included in the MFP, together with data stored in the HDD. The functions of CPU 111 shown in FIG. 8 are implemented as CPU 111 included in MFP 100 executes an image forming program stored in ROM 113, HDD 116, or memory card 119A.

Referring to FIG. 8, CPU 111 included in MFP 100 includes: a job receiving portion 151 which receives a print job; a job storing portion 153 which stores the print job in HDD 116; an operation accepting portion 161 which accepts an operation by a user; a print data generating portion 171 which generates print data on the basis of the print job; a conversion portion 173 which performs a prescribed process on the print data to convert it into processed data; an image forming controlling portion 177 which controls image forming portion 140 to form an image on the basis of the print data or the processed data; a second reduction information generating portion 175 which generates second reduction information; and a history storing portion 179 which stores history information in which the first reduction information and the second reduction information are associated with the print job.

When communication I/F portion 112 receives a print job from one of PCs 200 and 200A to 200D, job receiving portion 151 acquires the received print job. As was described above, PCs 200 and 200A to 200D transmit the user identification information and the first reduction information together with the print job. Thus, job receiving portion 151 acquires a set of the print job, the user identification information, and the first reduction information from communication I/F portion 112, and outputs the acquired set of them to job storing portion 153.

Job storing portion 153, on receipt of the set of the print job, the user identification information, and the first reduction information from job receiving portion 151, stores the print job and the user identification information in HDD 116 in association with each other, and also stores the first reduction information in HDD 116 in association with job identification information for identifying the print job. This causes print job 193 and first reduction information 195 to be stored in HDD 116. Print job 193 may be associated with the user identification information by storing, in HDD 116, data that includes information for identifying print job 193, which is for example a filename, and the user identification information. First reduction information 195 may be associated with the job identification information by storing, in HDD 116, data that includes information for identifying first reduction information 195, which is for example a filename, and the job identification information.

Operation accepting portion 161 includes: a second authentication portion 163 which authenticates a user; a screen displaying portion 165 which displays an operation screen on display portion 160A; and a permission accepting portion 167 which accepts permission by a user.

Second authentication portion 163 authenticates a user who operates MFP 100. Second authentication portion 163 stores a set of user identification information for identifying a user who is authorized to operate MFP 100 and a password in HDD 116 in advance. When a user inputs a set of user identification information and a password to operation portion 160B, if the same set as that input by the user is stored in HDD 116, second authentication portion 163 authenticates the user; otherwise, second authentication portion 163 does not authenticate the user. The set of user identification information for identifying a user who is authorized to operate MFP 100 and a password does not necessarily have to be stored in HDD 116; it may be stored in another computer, such as a server, which is connected to network 2.

When second authentication portion 163 authenticates a user, it outputs the user identification information of the user to screen displaying portion 165 and print data generating portion 171. Once second authentication portion 163 has authenticated the user who operates MFP 100, it treats any instruction that is input to operation portion 160B as an operation input by the authenticated user, until a logoff operation is input to operation portion 160B or until a predetermined time has passed with no operation input.

Print data generating portion 171 reads, from among print jobs 193 stored in HDD 116, print job 193 that is associated with the user identification information received from second authentication portion 163, and generates print data on the basis of the read print job 193. The print data is data which can be processed by image forming portion 140. It is here assumed that the print data is raster data. Print data generating portion 171 outputs the generated print data to second reduction information generating portion 175, conversion portion 173, and image forming controlling portion 177. Print data generating portion 171 outputs to second reduction information generating portion 175 the user identification information associated with the read print job 193 and the job identification information for identifying the print job 193, together with the print data.

Although it is here assumed that CPU 111 has print data generating portion 171 as one of its functions, a raster image processor (RIP) may be provided apart from CPU 111 to cause the RIP to perform conversion of the print data.

Conversion portion 173 performs a prescribed process on the print data received from print data generating portion 171 to convert the print data into the processed data. The prescribed process is image processing that is performed on the raster data, which here includes a blank-page removing process and a color reduction process.

The blank-page removing process is a process in which it is determined, for each of a plurality of pages included in the raster data, whether data corresponding to the page is blank or not, and the data of the blank page is removed from the raster data. As a way of determining a blank page in raster data, for example, the number of pixels having a pixel value equal to or greater than a predetermined value is counted for data of each page in the raster data, and the data of the page in which the number of the relevant pixels is not greater than a predetermined number of pieces is determined to be a blank page.

The color reduction process is a process in which the number of colors is decreased. A predetermined conversion table is used to convert the values of cyan (C), magenta (M), yellow (Y), and black (B) for each pixel. The amount of toner to be consumed can be calculated from the pixel values for each of the raster data before and after the color reduction process.

Conversion portion 173 performs the blank-page removing process on the print data received from print data generating portion 171 to output the processed data as first converted data to second reduction information generating portion 175 and image forming controlling portion 177. Further, conversion portion 173 performs the color reduction process on the print data received from print data generating portion 171 to output the processed data as second converted data to second reduction information generating portion 175 and image forming controlling portion 177. Furthermore, conversion portion 173 performs the blank-page removing process and the color reduction process on the print data received from print data generating portion 171 to output the processed data as third converted data to second reduction information generating portion 175 and image forming controlling portion 177.

Second reduction information generating portion 175 compares the first converted data, the second converted data, and the third converted data received from conversion portion 173 with the print data received from print data generating portion 171, and outputs the comparison results to screen displaying portion 165. As a result of comparison between the first converted data and the print data, if second reduction information generating portion 175 determines that the number of pages will be reduced with the first converted data than with the print data, it outputs the comparison result indicating that the number of pages will be decreased. As a result of comparison between the second converted data and the print data, if second reduction information generating portion 175 determines that the consumed amount of toner will be reduced with the second converted data than with the print data, it outputs the comparison result indicating that the consumed amount of toner will be decreased. As a result of comparison between the third converted data and the print data, if second reduction information generating portion 175 determines that both the number of pages and the consumed amount of toner will be reduced as compared with the case of using the print data, it outputs the comparison result indicating that the number of pages and the consumed amount of toner will both be decreased. In the case where second reduction information generating portion 175 determines that neither the number of pages nor the consumed amount of toner will be reduced as compared with the case of using the print data, it outputs the comparison result indicating that the resources will not be able to be saved.

Whether there is a blank page in the raster data, or whether the amount of toner to be used will be decreased by the color reduction process cannot be determined from only the print condition included in the print job, and cannot be determined unless the blank-page removing process or the color reduction process is performed on the raster data.

Screen displaying portion 165 displays on display portion 160A a permission accepting screen for accepting an operation of selecting a process to be performed by conversion portion 173, on the basis of the comparison result received from second reduction information generating portion 175, and also outputs the comparison result to permission accepting portion 167. In the case where the comparison result received from second reduction information generating portion 175 indicates that both the number of pages and the consumed amount of toner will be decreased, screen displaying portion 165 displays on display portion 160A a permission accepting screen for accepting an operation of causing either one or both of the blank-page removing process and the color reduction process to be performed. In the case where the comparison result indicates that only the number of pages will be decreased, screen displaying portion 165 displays on display portion 160A a permission accepting screen for accepting an operation of causing the blank-page removing process to be performed. In the case where the comparison result indicates that only the consumed amount of toner will be decreased, screen displaying portion 165 displays on display portion 160A a permission accepting screen for accepting an operation of causing the color reduction process to be performed. In the case where the comparison result indicates that the resources will not be able to be saved, screen displaying portion 165 displays no permission accepting screen on display portion 160A.

Figure 9:
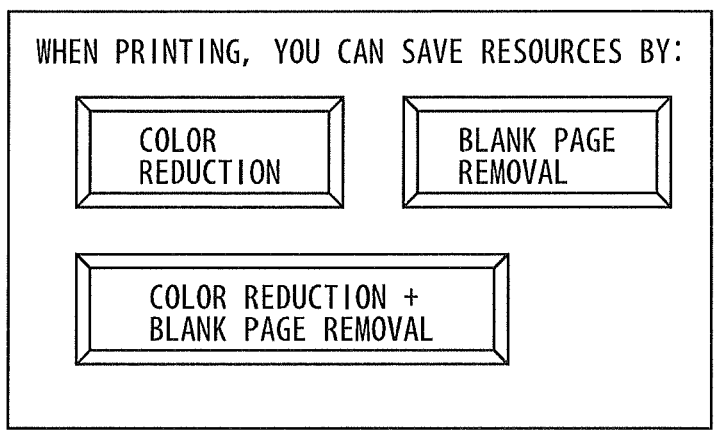
FIG. 9 shows an example of a permission accepting screen for accepting an operation of causing one or both of a blank-page removing process and a color reduction process to be performed.

FIG. 9 shows an example of the permission accepting screen for accepting an operation of causing either one or both of the blank-page removing process and the color reduction process to be performed. Referring to FIG. 9, the permission accepting screen includes a button having "color reduction" displayed thereon, a button having "blank page removal" displayed thereon, and a button having "color reduction+blank page removal" displayed thereon.

Returning to FIG. 8, when a user designates the "color reduction" button included in the permission accepting screen shown in FIG. 9, permission accepting portion 167 accepts an instruction to perform only the color reduction process. When a user designates the "blank page removal" button on the permission accepting screen shown in FIG. 9, permission accepting portion 167 accepts an instruction to perform only the blank-page removing process. When a user designates the "color reduction+blank page removal" button on the permission accepting screen shown in FIG. 9, permission accepting portion 167 accepts an instruction to perform both the color reduction process and the blank-page removing process. When a user designates a cancel key included in operation portion 160B in the state where a permission accepting screen is displayed on display portion 160A, permission accepting portion 167 accepts an instruction to perform neither the color reduction process nor the blank-page removing process. Permission accepting portion 167 outputs the accepted instruction to image forming controlling portion 177 and second reduction information generating portion 175.

Image forming controlling portion 177 controls image forming portion 140 to select one of the first, second, and third converted data received from conversion portion 173 or the print data received from print data generating portion 171, on the basis of the instruction received from permission accepting portion 167, for forming an image. Specifically, when receiving an instruction to perform only the blank-page removing process from permission accepting portion 167, image forming controlling portion 177 selects and outputs the first converted data to image forming portion 140, thereby causing image forming portion 140 to form an image of the first converted data. When receiving an instruction to perform only the color reduction process from permission accepting portion 167, image forming controlling portion 177 selects and outputs the second converted data to image forming portion 140, thereby causing image forming portion 140 to form an image of the second converted data. When receiving an instruction to perform both the color reduction process and the blank-page removing process from permission accepting portion 167, image forming controlling portion 177 selects and outputs the third converted data to image forming portion 140, thereby causing image forming portion 140 to form an image of the third converted data. When receiving an instruction to perform neither the color reduction process nor the blank-page removing process from permission accepting portion 167, image forming controlling portion 177 selects and outputs the print data to image forming portion 140, thereby causing image forming portion 140 to form an image of the print data.

Second reduction information generating portion 175 compares one of the first converted data, the second converted data, and the third converted data with the print data to generate second reduction information. Specifically, second reduction information generating portion 175 selects one of the first, second, and third converted data in accordance with the instruction received from permission accepting portion 167, to compare the selected data with the print data for generating the second reduction information. When receiving an instruction to perform only the blank-page removing process from permission accepting portion 167, second reduction information generating portion 175 compares the first converted data with the print data. When receiving an instruction to perform only the color reduction process, second reduction information generating portion 175 compares the second converted data with the print data. When receiving an instruction to perform both the color reduction process and the blank-page removing process, second reduction information generating portion 175 compares the third converted data with the print data. When receiving an instruction to perform neither the color reduction process nor the blank-page removing process, second reduction information generating portion 175 generates no second reduction information.

In the case where second reduction information generating portion 175 compares the first converted data with the print data, it detects a difference in the number of pages, and sets the detected difference in the number of pages in the second reduction information. The difference in the number of pages indicates the number of sheets of paper on which it became no longer necessary to form images. Therefore, second reduction information generating portion 175 calculates power that would have been consumed if images had been formed on that number of sheets of paper, and sets the calculated power consumption in the second reduction information. In the case where second reduction information generating portion 175 compares the second converted data with the print data, it detects a difference in the consumed amount of toner, and sets the detected difference in the consumed amount of toner in the second reduction information. In the case where second reduction information generating portion 175 compares the third converted data with the print data, it detects differences in the number of pages and the consumed amount of toner, and sets the detected differences in the number of pages and the consumed amount of toner in the second reduction information. Further, second reduction information generating portion 175 calculates power consumption on the basis of the difference in the number of pages, and sets the calculated power consumption in the second reduction information.

Second reduction information generating portion 175 outputs the second reduction information together with the user identification information and the job identification information received from print data generating portion 171 to history storing portion 179. In the case where second reduction information generating portion 175 receives from permission accepting portion 167 an instruction to perform neither the blank-page removing process nor the color reduction process, second reduction information generating portion 175 generates no second reduction information, and thus, it outputs only the user identification information and the job identification information to history storing portion 179.

In the case where history storing portion 179 receives the user identification information, the second reduction information, and the job identification information from second reduction information generating portion 175, history storing portion 179 reads, from first reduction information 195 stored in HDD 116, the piece of first reduction information 195 that is associated with the job identification information. History storing portion 179 then generates a history record which includes the user identification information, the job identification information, the read first reduction information, and the second reduction information, and adds and stores the generated history record into history data 191 stored in HDD 116.

In the case where history storing portion 179 receives the user identification information and the job identification information from second reduction information generating portion 175, history storing portion 179 reads, from first reduction information 195 stored in HDD 116, the piece of first reduction information 195 that is associated with the job identification information. Then, history storing portion 179 generates a history record which includes the user identification information, the job identification information, and the read first reduction information, and adds and stores the generated history record into history data 191 stored in HDD 116.

While it is here assumed that a history record includes the first reduction information and the second reduction information separately from each other, the first reduction information and the second reduction information both include the fields of the number of used sheets of paper, the consumed amount of toner, and the power consumption that are reduced. Therefore, a history record may be configured to include, for each field, only the sum of the corresponding values in the first and second reduction information. Further, while it is here assumed that the first reduction information and the second reduction information each include the fields of the number of used sheets of paper, the consumed amount of toner, and the power consumption that are reduced, it may be configured such that the first and second reduction information each include the fields of reduction rates of the number of used sheets of paper, the consumed amount of toner, and the power consumption in addition to, or in place of, the above-described fields.

History data 191 includes, for each user identification information, the number of used sheets of paper, the consumed amount of toner, and the power consumption that have been reduced, and/or the reduction rates thereof, enabling history data 191 to be collected for each user. This allows the number of sheets of paper saved, the amount of toner saved, and the power saved, and/or the reduction rates (or, saving rates) thereof to be compared among a plurality of users. History data 191 can further be used for various analyses.

Figure 10:
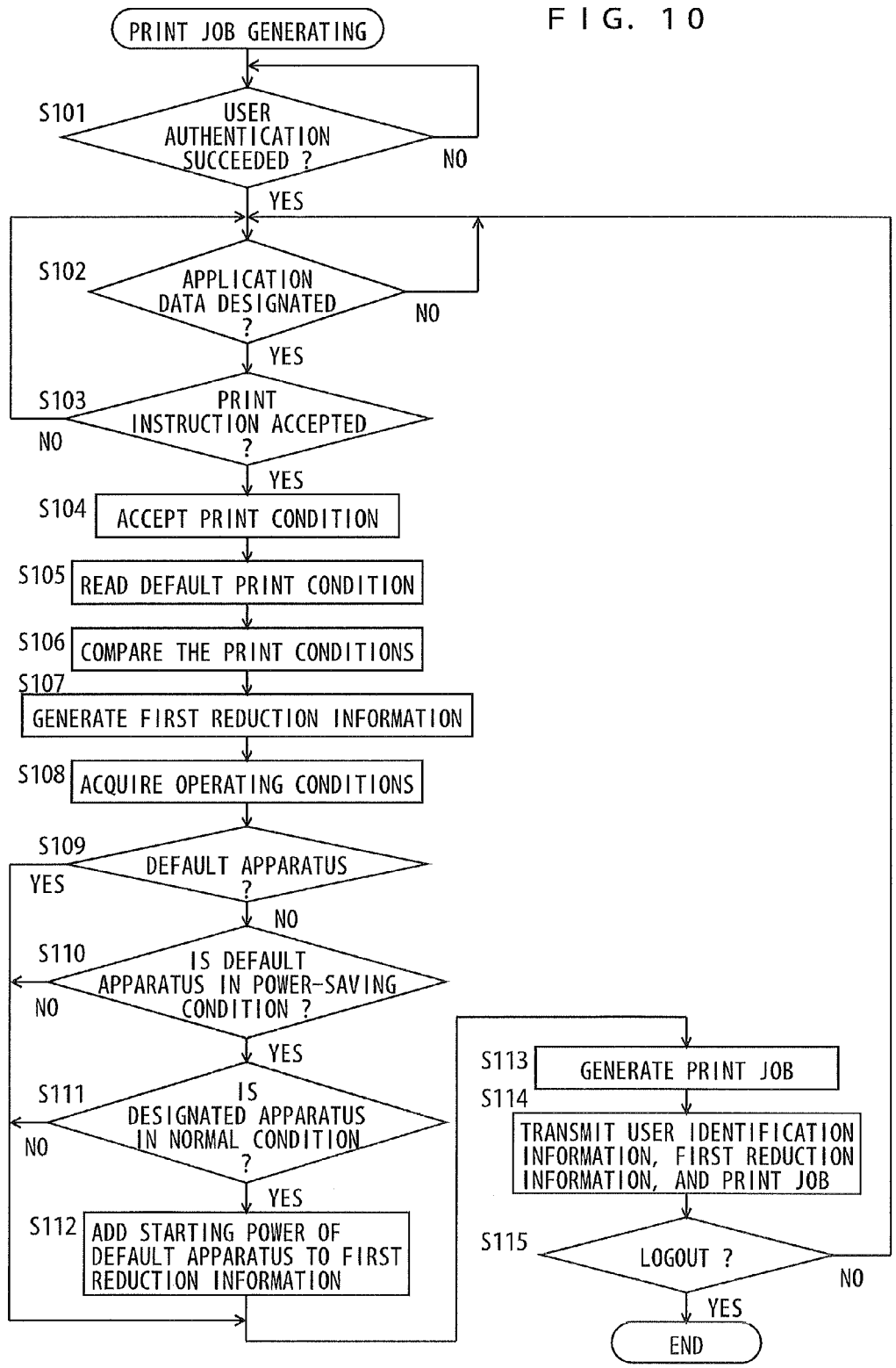
FIG. 10 is a flowchart illustrating an example of the flow of a print job generating process.

FIG. 10 is a flowchart illustrating an example of the flow of a print job generating process. The print job generating process is carried out by CPU 201 included in each of PCs 200 and 200A to 200D as CPU 201 executes a driver program. Referring to FIG. 10, CPU 201 determines whether a user authentication has succeeded (step S101). CPU 201 is in a standby mode until the user authentication succeeds (NO in step S101), and once the user authentication has succeeded (YES in step S101), the process proceeds to step S102.

In step S102, it is determined whether a designation of application data has been accepted. CPU 201 is in a standby mode until the designation of application data is accepted (NO in step S102), and once the designation of application data has been accepted (YES in step S102), the process proceeds to step S103. In the case where a user has caused CPU 201 to execute an application program, CPU 201 regards the data being processed by the application program as the application data, and the process proceeds to step S103. Also in the case where an instruction to designate one of the pieces of application data 293 stored in HDD 209 is accepted, the process proceeds to step S103.

In step S103, it is determined whether a print instruction has been accepted. For example in the case where a user inputs an operation of depressing a print key included in operation portion 211, the print instruction is accepted. If the print instruction has been accepted, the process proceeds to step S104; otherwise, the process returns to step S102.

In step S104, CPU 201 accepts a print condition. CPU 201 displays on LCD 207 one of the print condition setting screens shown in FIGS. 5 to 7, and accepts the print condition input to operation portion 211 by a user in accordance with the print condition setting screen. In the following step S105, CPU 201 reads default print condition 291 stored in advance in HDD 209. CPU 201 then compares the print condition accepted in step S104 with the default print condition read in step S105 (step S106).

In step S107, CPU 201 generates first reduction information. CPU 201 calculates differences in the number of sheets of paper to be consumed, the amount of toner to be consumed, and power to be consumed, on the basis of the comparison between the print conditions in step S106, to generate the first reduction information which includes the calculated differences in the number of sheets of paper to be consumed, the amount of toner to be consumed, and the power to be consumed.

In the following step S108, CPU 201 acquires an operating condition of an image forming apparatus. In the present embodiment, MFPs 100 and 100A are provided as the image processing apparatuses. Therefore, CPU 201 detects the operating conditions of MFPs 100 and 100A on the basis of the MIBs received therefrom. In the following step S109, it is determined whether the image forming apparatus specified by the print condition accepted in step S104 is the default apparatus predetermined for the user who has been authenticated in step S101. If so, the process proceeds to step S113; otherwise, the process proceeds to step S110.

In step S110, CPU 201 determines whether the default apparatus is in the power-saving condition. If so, the process proceeds to step S111; otherwise, the process proceeds to step S113. In step S111, CPU 201 determines whether the image forming apparatus (designated apparatus) specified by the print condition accepted in step S104 is in the normal condition. If so, the process proceeds to step S112; otherwise, the process proceeds to step S113, with step S112 being skipped. The designated apparatus in the case where the process proceeds to step S111 is an image forming apparatus that is different from the default apparatus.

In step S112, CPU 201 adds a value of staring power of the default apparatus to the first reduction information, and the process proceeds to step S113. The value of the starting power of the default apparatus is power that is necessary to change the operating condition of the default apparatus from the power-saving condition to the normal condition, and has been stored in advance in HDD 209.

In step S113, CPU 201 generates a print job for forming an image of the application data designated in step S102 on the basis of the print condition accepted in step S104. In the following step S114, CPU 201 transmits the user identification information of the user who has been authenticated in step S101, the first reduction information generated in step S107, and the print job generated in step S113 to the designated apparatus specified by the print condition accepted in step S104. The process then proceeds to step S115. In step S115, CPU 201 determines whether a logout operation has been accepted. If so, the process is terminated; otherwise, the process returns to step S102.

Figure 11:
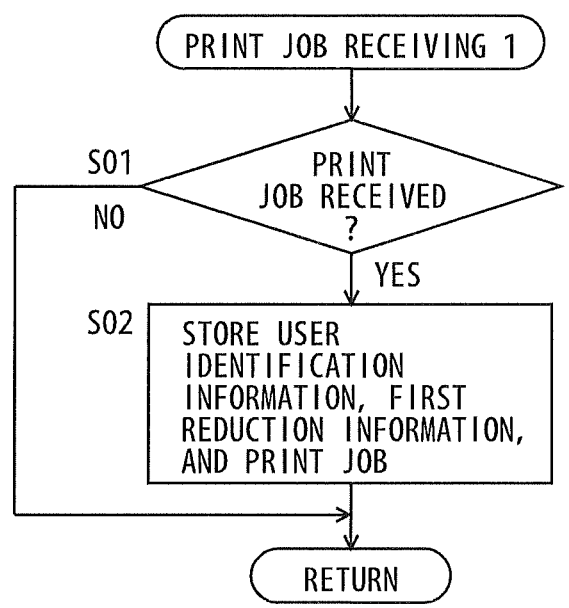
FIG. 11 is a flowchart illustrating an example of the flow of a print job receiving process.

FIG. 11 is a flowchart illustrating an example of the flow of a print job receiving process. The print job receiving process is carried out by CPU 111 included in each of MFPs 100 and 100A as CPU 111 executes an image forming program. It is here assumed that CPU 111 included in MFP 100 executes the image forming program.

Referring to FIG. 11, CPU 111 determines whether a print job has been accepted (step S01). If communication I/F portion 112 has received a print job from one of PCs 200 and 200A to 200D, the process proceeds to step S02; otherwise, the process is terminated. The one of PCs 200 and 200A to 200D transmits the user identification information and the first reduction information together with the print job. Therefore, when the print job is received, the user identification information and the first reduction information are received as well. In step S02, the received user identification information, first reduction information, and print job are stored in HDD 116, and the process is terminated. In the present embodiment, the print job and the user identification information are stored in HDD 116 in association with each other, and the first reduction information is stored in HDD 116 in association with job identification information for identifying the print job.

Figure 12:
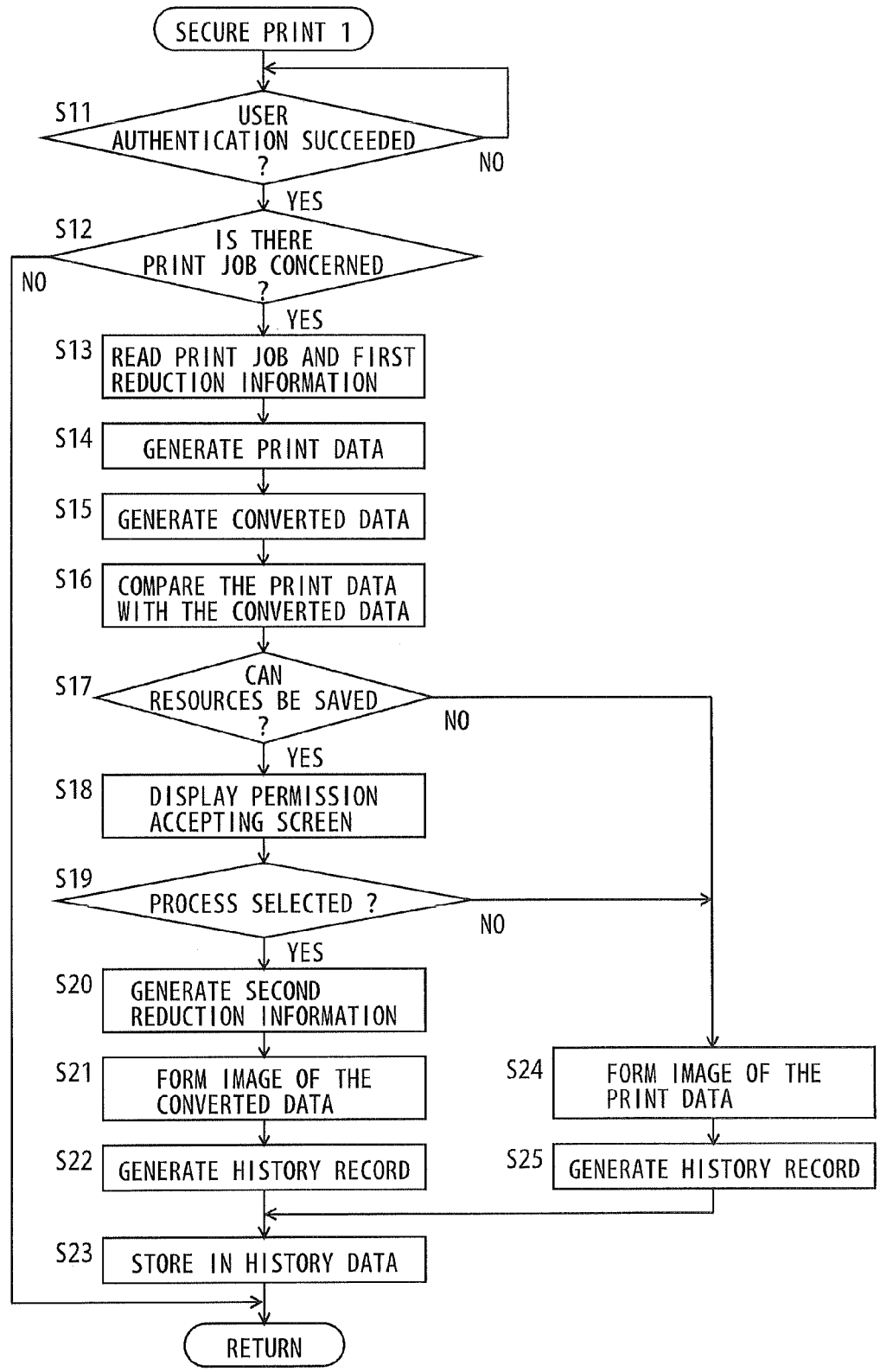
FIG. 12 is a flowchart illustrating an example of the flow of a secure print process.

FIG. 12 is a flowchart illustrating an example of the flow of a secure print process. The secure print process is carried out by CPU 111 included in each of MFPs 100 and 100A as CPU 111 executes the image forming program. It is here assumed that CPU 111 included in MFP 100 executes the image forming program.

Referring to FIG. 12, CPU 111 determines whether a user authentication has succeeded (step S11). CPU 111 is in a standby mode until the user authentication succeeds (NO in step S11), and once the user authentication has succeeded (YES in step S11), the process proceeds to step S12.

In step S12, it is determined whether there is a print job the printing of which has been designated by the authenticated user. Specifically, it is determined whether print jobs 193 stored in HDD 116 include the print job that is associated with the user identification information of the user who has been authenticated in step S11. The print job associated with the user identification information of the authenticated user is a print job that the authenticated user has designated its printing in one of PCs 200 and 200A to 200D. If there is such a print job associated with the user identification information of the authenticated user, the process proceeds to step S13; otherwise, the secure print process is terminated.

In step S13, CPU 111 reads, from HDD 116, print job 193 that has been stored in association with the user identification information of the user authenticated in step S11 and first reduction information 195 that has been stored in association with the job identification information of that print job 193. In the following step S14, CPU 111 generates print data in accordance with the print condition included in the read print job. In the following step S15, CPU 111 performs the blank-page removing process and/or the color reduction process on the print data to thereby generate converted data. It is here assumed that CPU 111 generates the first converted data by performing the blank-page removing process on the print data, generates the second converted data by performing the color reduction process on the print data, and generates the third converted data by performing the blank-page removing process and the color reduction process on the print data.

In step S16, CPU 111 compares the print data generated in step S14 with the converted data generated in step S15. Specifically, CPU 111 compares each of the first converted data, the second converted data, and the third converted data with the print data. When comparing the first converted data with the print data, CPU 111 detects a difference in the number of pages and assumes the detected difference in the number of pages as the number of sheets of paper to be saved. When comparing the second converted data with the print data, CPU 111 detects a difference in the amount of toner to be consumed and assumes the detected difference in the amount of toner as the amount of toner to be saved. When comparing the third converted data with the print data, CPU 111 detects differences in the number of pages and the amount of toner, and assumes the detected difference in the number of pages as the number of sheets of paper to be saved and the detected difference in the amount of toner as the amount of toner to be saved.

In the following step S17, CPU 111 determines, on the basis of the comparison result between the print data and the converted data, whether the resources can be saved. Specifically, CPU 111 determines that it is possible to save the resources in the case where CPU 111 has obtained the number of sheets of paper that can be saved and/or the amount of toner that can be saved. If the resources can be saved, the process proceeds to step S18; otherwise, the process proceeds to step S24.

In step S18, CPU 111 displays a permission accepting screen. When both the number of sheets of paper and the amount of toner that can be saved have been obtained, CPU 111 displays the permission accepting screen shown in FIG. 9 on display portion 160A. When only the number of sheets of paper that can be saved has been obtained, CPU 111 displays, on display portion 160A, the permission accepting screen shown in FIG. 9 in which only the "blank page removal" button is selectable. When only the amount of toner that can be saved has been obtained, CPU 111 displays, on display portion 160A, the permission accepting screen shown in FIG. 9 in which only the "color reduction" button is selectable.

In the following step S19, it is determined whether a selection of the process(es) has been accepted. If so, the process proceeds to step S20; otherwise, the process proceeds to step S24. When any of the "color reduction" button, the "blank page removal" button, and the "color reduction+blank page removal" button has been designated in the permission accepting screen, it is determined that at least one process has been selected, and the process proceeds to step S20. When the cancel key has been designated, the process proceeds to step S24.

In step S20, CPU 111 generates second reduction information. On the basis of the comparison of each of the first converted data, the second converted data, and the third converted data with the print data in step S14, CPU 111 calculates differences in the number of used sheets of paper, the consumed amount of toner, and the power consumption, to thereby generate the second reduction information which includes the calculated differences in the number of used sheets of paper, the consumed amount of toner, and the power consumption. Specifically, in the case where the "blank page removal" button has been selected in step S19, CPU 111 compares the first converted data generated in step S15 with the print data to detect a difference in the number of pages, and sets the detected difference in the number of pages in the second reduction information. The difference in the number of pages indicates the number of sheets of paper on which it became no longer necessary to form images. Therefore, CPU 111 calculates power that would have been consumed if images had been formed on that number of sheets of paper, and sets the calculated power consumption in the second reduction information. In the case where the "color reduction" button has been selected in step S19, CPU 111 compares the second converted data with the print data to detect a difference in the consumed amount of toner, and sets the detected difference in the consumed amount of toner in the second reduction information. In the case where the "color reduction+blank page removal" button has been selected in step S19, CPU 111 compares the third converted data with the print data to detect differences in the number of pages and the consumed amount of toner, and sets the detected differences in the number of pages and the consumed amount of toner in the second reduction information. Further, CPU 111 calculates power consumption on the basis of the difference in the number of pages, and set the calculated power consumption in the second reduction information.

In step S21, CPU 111 forms an image of the converted data. Specifically, in the case where the "blank page removal" button has been selected in step S19, CPU 111 outputs the first converted data generated in step S15 to image forming portion 140, to cause image forming portion 140 to form an image of the first converted data. In the case where the "color reduction" button has been selected in step S19, CPU 111 outputs the second converted data to image forming portion 140, to cause image forming portion 140 to form an image of the second converted data. In the case where the "color reduction+blank page removal" button has been selected in step S19, CPU 111 outputs the third converted data to image forming portion 140, to cause image forming portion 140 to form an image of the third converted data.

In step S22, a history record is generated, and the process proceeds to step S23. The history record generated in step S22 includes the user identification information of the user authenticated in step S11, the job identification information of the print job read in step S13, the first reduction information read in step S13, and the second reduction information generated in step S20. In the following step S23, the generated history record is added and stored into history data 191 which is stored in HDD 116.

On the other hand, in step S24, an image of the print data generated in step S14 is formed. Specifically, CPU 111 transmits the print data to image forming portion 140, to cause image forming portion 140 to form an image of the print data. In the following step S25, CPU 111 generates a history record, and the process proceeds to step S23. The history record generated in step S25 includes the user identification information of the user authenticated in step S11, the job identification information of the print job read in step S13, and the first reduction information read in step S13.

FIG. 13 shows an example of history data. The history data in FIG. 13 includes, in each of the fields, a sum of the corresponding values included in the first reduction information and the second reduction information. Each history record includes, as the amounts of saved resources, the paper reduction rate, the toner reduction rate, and the power consumption that can be reduced. Referring to FIG. 13, a history record includes the fields of "job identification information", "paper", "toner amount", and "power consumption". The history record having "job 1" set in the "job identification information" field indicates that the number of used sheets of paper can be reduced by "50%", the consumed amount of toner can be reduced by "0%", and the power consumption can be reduced by "50 W". The values listed in the history record indicate the ratio of the reduced number of sheets of paper, the ratio of the reduced amount of toner, and the reduced power consumption, as compared with the number of sheets of paper, the amount of toner, and the amount of power that would be consumed under the default print condition when neither the color reduction process nor the blank-page removing process is performed.

As described above, in image forming system 1 of the first embodiment, each of PCs 200 and 200A to 200D generates the first reduction information which includes the difference between the amount of resources to be consumed when one of MFPs 100 and 100A that is designated by a user, e.g. MFP 100, forms an image of application data designated by the user in accordance with the print condition set by the user and the amount of resources to be consumed when MFP 100 forms an image of the application data in accordance with a predetermined print condition, generates a print job for causing MFP 100 to form the image on the basis of the print condition set by the user, and transmits the first reduction information together with the print job to MFP 100. Each of MFPs 100 and 100A generates print data from the print job received from one of PCs 200 and 200A to 200D, performs a blank-page removing process and/or a color reduction process on the print data to convert the data into processed data, and generates second reduction information which includes the difference between the amount of resources to be consumed when an image is formed on the basis of the print data and the amount of resources to be consumed when an image is formed on the basis of the processed data. Then, in response to the event that the image is formed on the basis of the processed data, the MFP generates a history record in which the first reduction information and the second reduction information are associated with the print job, and adds the history record into history data 191 stored in HDD 116. The second reduction information is stored as a history, in addition to the first reduction information, allowing the amount of saved resources to be accurately stored as a history.

Further, each of PCs 200 and 200A to 200D acquires operating conditions of the respective MFPs 100 and 100A. In the case where a designated apparatus that has been selected from the plurality of MFPs 100 and 100A by a user to cause it to form an image is not a default apparatus predetermined for the user, in the event that the default apparatus is in the power-saving condition and the designated apparatus is in the normal condition, then the first reduction information including a value of power (i.e. starting power) that is necessary to change the operating condition of the default apparatus from the power-saving condition to the normal condition is generated. As a result, the starting power that would be consumed if the default apparatus were caused to form an image can be managed as the amount of saved resources.

Furthermore, when a user logs in on one of MFPs 100 and 100A, a permission accepting screen is displayed. This eliminates the need for the user to perform setting for causing MFP 100 or 100A to execute the blank-page removing process and/or the color reduction process, leading to simplification of the operation.

Second Embodiment

In image forming apparatus 1 of the first embodiment, the first reduction information is generated in one of PCs 200 and 200A to 200D. In an image forming apparatus 1 according to a second embodiment, the first reduction information is generated in one of MFPs 100 and 100A. The other configuration is identical to that of image forming apparatus 1 of the first embodiment. In the following, differences from the above-described image forming apparatus 1 will primarily be described.

When a user sets a print condition in one of PCs 200 and 200A to 200D of the second embodiment, the PC transmits a set of a print job including the print condition and user identification information of the user who has set the print condition, to one of MFPs 100 and 100A designated by the user. The functions of CPU 201 in each of PCs 200 and 200A to 200D of the second embodiment are identical to those of CPU 201 shown in FIG. 4 except that operating condition acquiring portion 251 and first reduction information generating portion 255 are not included.

Figure 14:
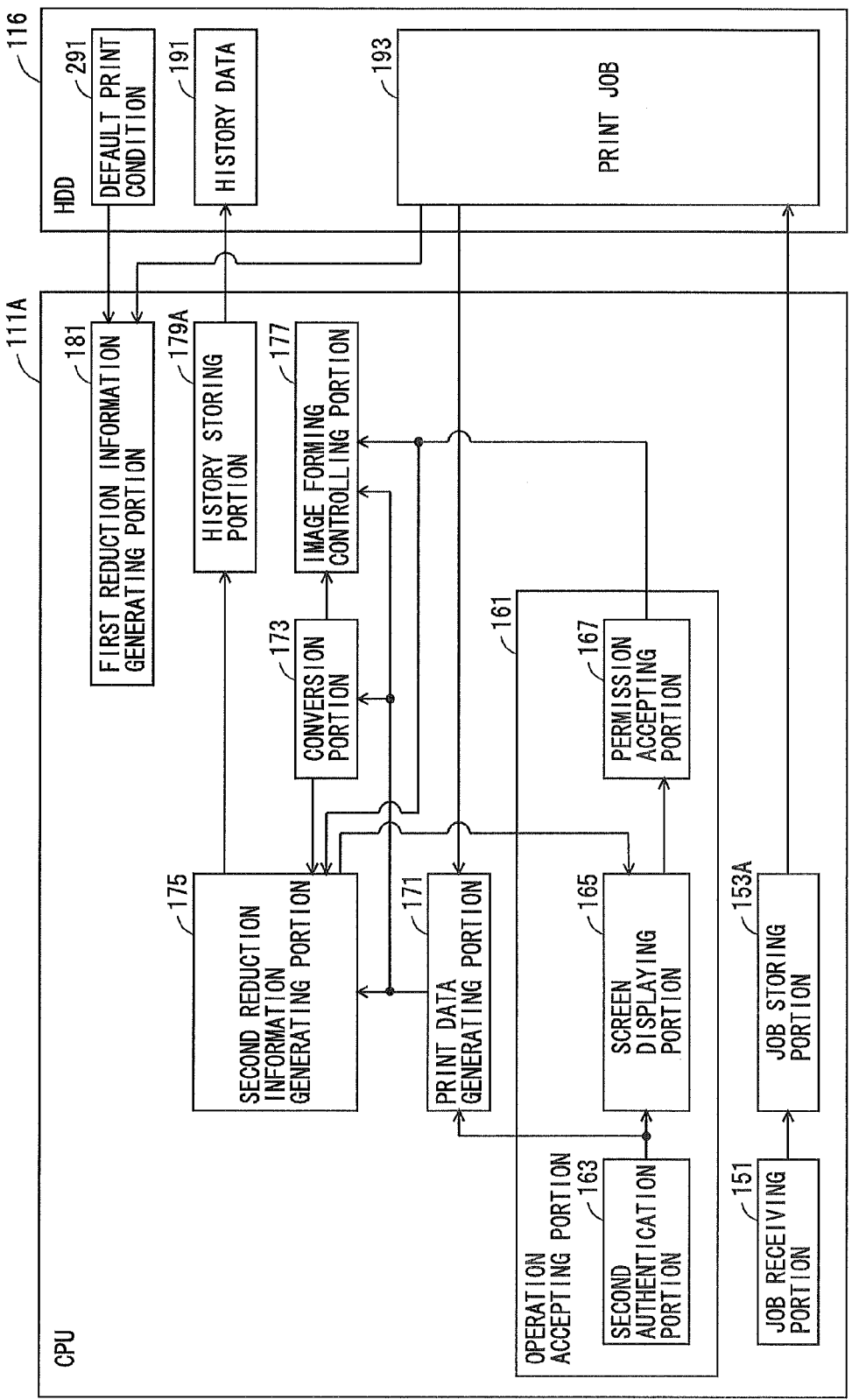
FIG. 14 is a block diagram showing, by way of example, the functions of the CPU included in the MFP according to a second embodiment.

MFPs 100 and 100A of the second embodiment are identical to each other, and thus, MFP 100 will be described representatively. FIG. 14 is a block diagram showing, by way of example, the functions of the CPU included in the MFP according to the second embodiment. Referring to FIG. 14, this block diagram is different from the block diagram shown in FIG. 8 in that a first reduction information generating portion 181 has been added, job storing portion 153 has been changed to a job storing portion 153A, and history storing portion 179 has been changed to a history storing portion 179A.

Job storing portion 153A stores the print job received from job receiving portion 151 into HDD 116 in association with the user identification information, whereby print job 193 is stored in HDD 116.

First reduction information generating portion 181, likewise the first reduction information generating portion 255 shown in FIG. 4, generates first reduction information which includes a difference between the amount of resources to be consumed when an image is formed in accordance with the print condition and the amount of resources to be consumed when an image is formed in accordance with a default print condition. The print condition is the one included in the print job stored in HDD 116. Specifically, first reduction information generating portion 181 compares the print condition included in the print job stored in HDD 116 with the default print condition stored in HDD 116, to calculate the difference in the amount of resources to be consumed. The amount of resources to be consumed includes the number of sheets of paper to be consumed, the amount of toner to be consumed, and power to be consumed. First reduction information generating portion 181 outputs the generated first reduction information to history storing portion 179A.

When history storing portion 179A receives the first reduction information from first reduction information generating portion 181 and receives the user identification information, the second reduction information, and the job identification information from second reduction information generating portion 175, history storing portion 179A generates a history record including the user identification information, the job identification information, the first reduction information, and the second reduction information, and adds and stores the generated history record into history data 191 stored in HDD 116. Further, when history storing portion 179A receives the first reduction information from first reduction information generating portion 181 and receives the user identification information and the job identification information from second reduction information generating portion 175, history storing portion 179A generates a history record including the user identification information, the job identification information, and the first reduction information, and adds and stores the generated history record into history data 191 stored in HDD 116.

Figure 15:
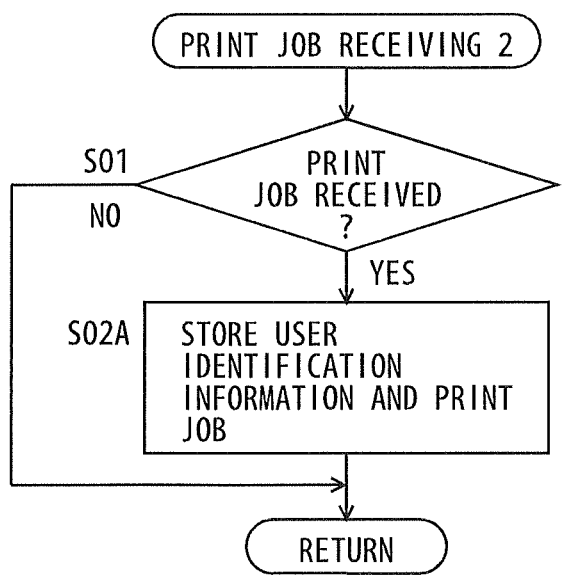
FIG. 15 is a flowchart illustrating an example of the flow of the print job receiving process according to the second embodiment.

FIG. 15 is a flowchart illustrating an example of the flow of the print job receiving process according to the second embodiment. Referring to FIG. 15, this flowchart is different from that of the print job receiving process shown in FIG. 11 in that step S02 has been changed to step S02A. In step S02A, when a set of the print job and the user identification information is received in step S01, the print job and the user identification information are stored in HDD 116 in association with each other.

Figure 16:
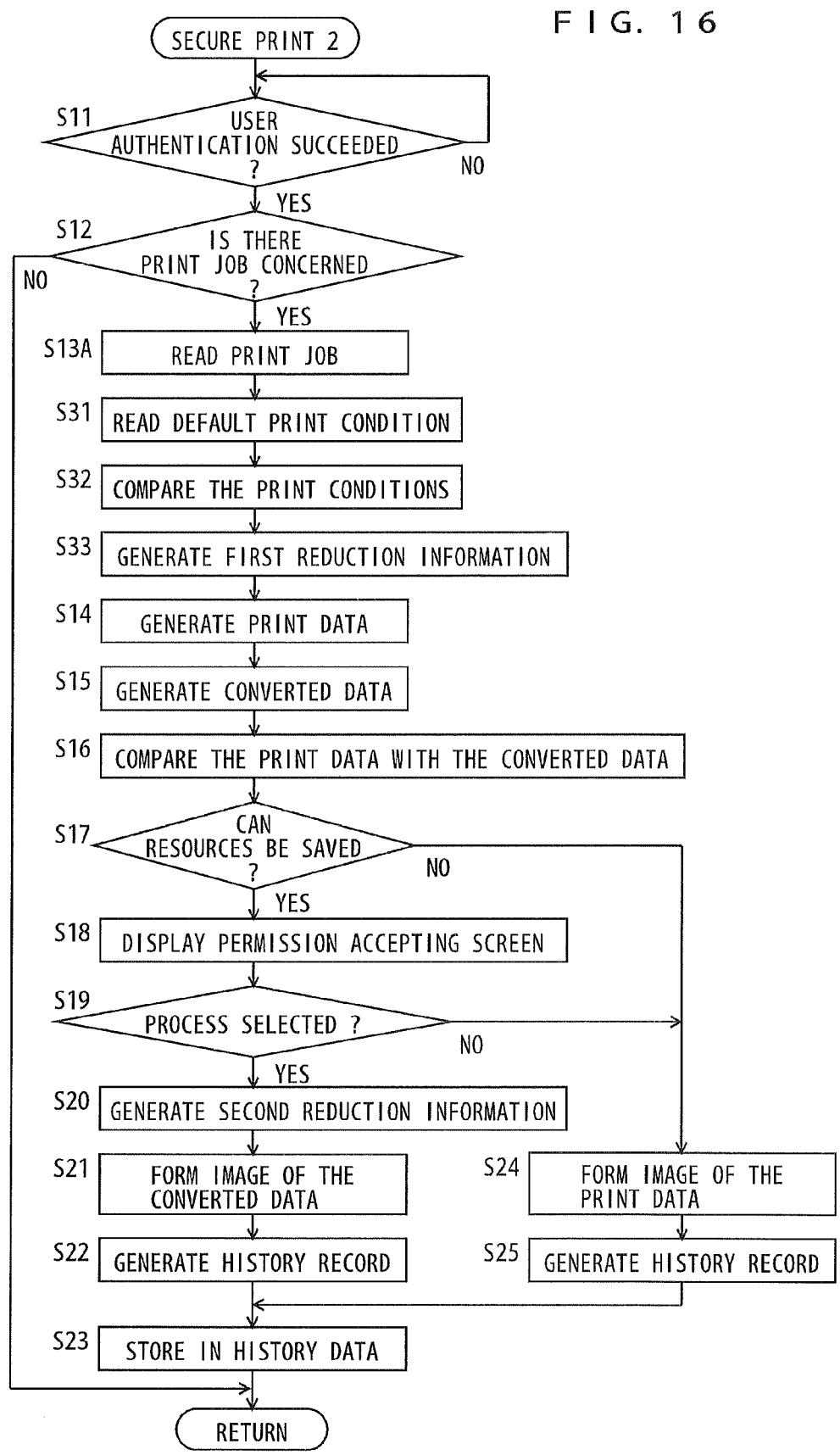
FIG. 16 is a flowchart illustrating an example of the flow of the secure print process according to the second embodiment.

FIG. 16 is a flowchart illustrating an example of the flow of the secure print process according to the second embodiment. The secure print process is carried out by CPU 111 included in each of MFPs 100 and 100A as CPU 111 executes the image forming program. It is here assumed that CPU 111 included in MFP 100 executes the image forming program.

Referring to FIG. 16, this flowchart is different from that of the secure print process shown in FIG. 12 in that step S13 has been changed to step S13A, and steps S31 to S33 have been added to between step S13A and step S14. The other steps are identical to those shown in FIG. 12, and thus, description thereof will not be repeated here.

In step S13A, CPU 111 reads, from print jobs 193 stored in HDD 116, the piece of print job 193 that is stored in association with the user identification information of the user who has been authenticated in step S11, and the process proceeds to step S31. In step S31, CPU 111 reads default print condition 291 stored in advance in HDD 116. CPU 111 then compares the print condition included in the print job 193 read in step S13A with the default print condition read in step S31 (step S32). In step S33, CPU 111 generates first reduction information. CPU 111 calculates, on the basis of the comparison of the print conditions in step S32, differences in the number of sheets of paper to be consumed, the amount of toner to be consumed, and power to be consumed, to thereby generate the first reduction information including the calculated differences in the number of sheets of paper to be consumed, the amount of toner to be consumed, and the power to be consumed.

Each of MFPs 100 and 100A according to the second embodiment receives a print job from one of PCs 200 and 200A to 200D, generates print data on the basis of the print job, performs a blank-page removing process and/or a color reduction process on the print data to convert the data into processed data, generates the first reduction information including a difference between the amount of resources to be consumed when an image is formed on the basis of the print condition included in the print job and the amount of resources to be consumed when an image is formed on the basis of a predetermined default print condition, generates the second reduction information including a difference between the amount of resources to be consumed when an image is formed on the basis of the print data and the amount of resources to be consumed when an image is formed on the basis of the processed data, and adds and stores into the history data a history record in which the first reduction information and the second reduction information are associated with the print job. In addition to the first reduction information, the second reduction information is stored as a history, allowing the amount of saved resources to be accurately stored as a history.

Further, when a print job associated with the user identification information of the authenticated user has been stored, a permission accepting screen is displayed. This eliminates the need for the user to perform setting for executing the blank-page removing process and/or the color reduction process.

While image forming system 1 as well as PCs 200 and 200A to 200D as examples of the information processing apparatuses and MFPs 100 and 100A as examples of the image forming apparatuses included in the image forming system have been described in the above embodiments, the present invention may of course be understood as an image forming method for executing the processes shown in FIGS. 9 to 12, 15, and 16, or as an image forming program for causing PCs 200 and 200A to 200D or computers which control MFPs 100 and 100A to execute the image forming method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming system including an image forming apparatus for forming an image and an information processing apparatus capable of communicating with said image forming apparatus, said information processing apparatus comprising:
a first processor configured to:
set a print condition;
generate, using the first processor, first reduction information including a difference, calculated using the first processor, between the amount of resources which will be consumed when said image forming apparatus forms an image in accordance with said set print condition and the amount of resources which will be consumed when said image forming apparatus forms an image in accordance with a predetermined print condition;
generate a print job for causing said image forming apparatus to form an image on the basis of said set print condition; and
transmit, using a communications interface, said generated first reduction information together with said generated print job to said image forming apparatus,
said image forming apparatus comprising:
a second processor configured to:
authenticate a user for permission to print the print job associated with the authenticated user in a secure print process;
generate print data on the basis of said print job received from said information processing apparatus;
perform, using the image forming apparatus second processor, a prescribed process on said generated print data to convert the data into processed data, the prescribed process being different from processes executed by using the print condition set by the first processor and executed by using the predetermined print condition;
display a permission accepting screen to allow a user to select the prescribed process that said second processor is able to perform when the user is authenticated by the second processor;
form an image on the basis of said generated print data or said processed data;
generate second reduction information including a difference between the amount of resources which will be consumed when said image forming apparatus forms an image on the basis of said generated print data and the amount of resources which will be consumed when said image forming apparatus forms an image on the basis of said processed data; and
store, in response to an event that said image forming apparatus forms an image on the basis of said processed data, history information in which said first reduction information and said second reduction information are associated with said print job;
wherein said image forming apparatus forms an image on the basis of said processed data on the condition that a user's operation of permitting resource saving is accepted by selecting the prescribed process, and
wherein said first reduction information and said second reduction information each include the number of sheets of paper, the amount of toner, and power consumption.

2. An image forming system including an image forming apparatus for forming an image and an information processing apparatus capable of communicating with said image forming apparatus, said information processing apparatus comprising:
a first processor configured to:
set a print condition;
generate, using the first processor, first reduction information including a difference, calculated using the first processor, between the amount of resources which will be consumed when said image forming apparatus forms an image in accordance with said set print condition and the amount of resources which will be consumed when said image forming apparatus forms an image in accordance with a predetermined print condition;
generate a print job for causing said image forming apparatus to form an image on the basis of said set print condition; and
transmit, using a communications interface, said generated first reduction information together with said generated print job to said image forming apparatus,
said image forming apparatus comprising:
a second processor configured to:
authenticate a user for permission to print the print job associated with the authenticated user in a secure print process;
generate print data on the basis of said print job received from said information processing apparatus;
perform, using the image forming apparatus second processor, a prescribed process on said generated print data to convert the data into processed data, the prescribed process being different from processes executed by using the print condition set by the first processor and executed by using the predetermined print condition;
display a permission accepting screen to allow a user to select the prescribed process that said second processor is able to perform when the user is authenticated by the second processor;
form an image on the basis of said generated print data or said processed data;
generate second reduction information including a difference between the amount of resources which will be consumed when said image forming apparatus forms an image on the basis of said generated print data and the amount of resources which will be consumed when said image forming apparatus forms an image on the basis of said processed data; and
store, in response to an event that said image forming apparatus forms an image on the basis of said processed data, history information in which said first reduction information and said second reduction information are associated with said print job;
wherein said image forming apparatus forms an image on the basis of said processed data on the condition that a user's operation of permitting resource saving is accepted by selecting the prescribed process, and
wherein said second processor is configured to:
compare the generated print data to said processed data;
display the permission accepting screen when the second processor determines that resources can be saved using the processed data, and
not display the permission accepting screen when the second processor determines that resources cannot be saved using the processed data.

3. The image forming system according to claim 2, wherein the second processor displays the permission accepting screen only for the prescribed process when the reduction of the resources is possible based on the second reduction information, and does not display the permission accepting screen if there is no prescribed process that reduces the resources.

4. An image forming apparatus comprising:
a processor configured to:
receive a print job including a print condition from an information processing apparatus;

authenticate a user for permission to print the print job associated with the authenticated user in a secure print process;

generate print data on the basis of said print job received from said information processing apparatus;

perform a prescribed process on said generated print data to convert the data into processed data, the prescribed process being different from processes executed by using a print condition set by the information processing apparatus and executed by using a predetermined print condition;

display a permission accepting screen to allow a user to select the prescribed process that said processor is able to perform when the user is authenticated by the processor;

form an image on the basis of said generated print data or said processed data;

generate first reduction information including a difference between the amount of resources which will be consumed when an image is formed on the basis of the print condition included in said received print job and the amount of resources which will be consumed when an image is formed on the basis of a predetermined print condition;

generate second reduction information including a difference between the amount of resources which will be consumed when said image forming apparatus forms an image on the basis of said generated print data and the amount of resources which will be consumed when said image forming apparatus forms an image on the basis of said processed data; and store, in response to an event that said image forming apparatus forms an image on the basis of said processed data, history information in which said first reduction information and said second reduction information are associated with said print job;

wherein said image forming apparatus forms an image on the basis of said processed data on the condition that a user's operation of permitting resource saving is accepted by selecting the prescribed process, and wherein said first reduction information and said second reduction information each include the number of sheets of paper, the amount of toner, and power consumption.

5. An image forming apparatus comprising:

a processor configured to:

receive a print job including a print condition from an information processing apparatus;

authenticate a user for permission to print the print job associated with the authenticated user in a secure print process;

generate print data on the basis of said print job received from said information processing apparatus;

perform a prescribed process on said generated print data to convert the data into processed data, the prescribed process being different from processes executed by using a print condition set by the information processing apparatus and executed by using a predetermined print condition;

display a permission accepting screen to allow a user to select the prescribed process that said processor is able to perform when the user is authenticated by the processor;

form an image on the basis of said generated print data or said processed data;

generate first reduction information including a difference between the amount of resources which will be consumed when an image is formed on the basis of the print condition included in said received print job and the amount of resources which will be consumed when an image is formed on the basis of a predetermined print condition;

generate second reduction information including a difference between the amount of resources which will be consumed when said image forming apparatus forms an image on the basis of said generated print data and the amount of resources which will be consumed when said image forming apparatus forms an image on the basis of said processed data; and store, in response to an event that said image forming apparatus forms an image on the basis of said processed data, history information in which said first reduction information and said second reduction information are associated with said print job;

wherein said image forming apparatus forms an image on the basis of said processed data on the condition that a user's operation of permitting resource saving is accepted by selecting the prescribed process, and wherein said processor is configured to:

compare the generated print data to said processed data;

display the permission accepting screen when the processor determines that resources can be saved using the processed data, and not display the permission accepting screen when the processor determines that resources cannot be saved using the processed data.

6. A non-transitory computer-readable recording medium encoded with an image forming program causing a computer in an image forming apparatus to execute processing comprising the steps of:

receiving a print job including a print condition from an information processing apparatus;

authenticating a user for permission to print the print job associated with the authenticated user in a secure print process;

generating print data on the basis of said print job received from said information processing apparatus;

performing a prescribed process on said generated print data to convert the data into processed data, the prescribed process being different from processes executed by using a print condition set by the information processing apparatus and executed by using a predetermined print condition;

displaying a permission accepting screen to allow a user to select the prescribed process that said image forming apparatus is able to perform when the user is authenticated;

forming an image on the basis of said generated print data or said processed data;

generating first reduction information including a difference between the amount of resources which will be consumed when an image is formed on the basis of the print condition included in said received print job and the amount of resources which will be consumed when an image is formed on the basis of a predetermined print condition;

generating second reduction information including a difference between the amount of resources which will be consumed when said image forming apparatus forms an image on the basis of said generated print data and the amount of resources which will be consumed when said image forming apparatus forms an image on the basis of said processed data; and storing, in response to an event that said image forming apparatus forms an image on the basis of said processed data, history information in which said first reduction information and said second reduction information are associated with said print job;

wherein said image forming apparatus forms an image on the basis of said processed data on the condition that a user's operation of permitting resource saving is accepted by selecting the prescribed process, and wherein said first reduction information and said second reduction information each include the number of sheets of paper, the amount of toner, and power consumption.

7. A non-transitory computer-readable recording medium encoded with an image forming program causing a computer in an image forming apparatus to execute processing comprising the steps of:

receiving a print job including a print condition from an information processing apparatus;

authenticating a user for permission to print the print job associated with the authenticated user in a secure print process;

generating print data on the basis of said print job received from said information processing apparatus;

performing a prescribed process on said generated print data to convert the data into processed data, the prescribed process being different from processes executed by using a print condition set by the information processing apparatus and executed by using a predetermined print condition;

displaying a permission accepting screen to allow a user to select the prescribed process that said image forming apparatus is able to perform when the user is authenticated;

forming an image on the basis of said generated print data or said processed data;

generating first reduction information including a difference between the amount of resources which will be consumed when an image is formed on the basis of the print condition included in said received print job and the amount of resources which will be consumed when an image is formed on the basis of a predetermined print condition;

generating second reduction information including a difference between the amount of resources which will be consumed when said image forming apparatus forms an image on the basis of said generated print data and the amount of resources which will be consumed when said image forming apparatus forms an image on the basis of said processed data; and storing, in response to an event that said image forming apparatus forms an image on the basis of said processed data, history information in which said first reduction information and said second reduction information are associated with said print job;

wherein said image forming apparatus forms an image on the basis of said processed data on the condition that a user's operation of permitting resource saving is accepted by selecting the prescribed process, and wherein said processing further includes:

comparing the generated print data to said processed data;

displaying the permission accepting screen when it is determined that resources can be saved using the processed data, and not displaying the permission accepting screen when it is determined that resources cannot be saved using the processed data.

* * * * *